United States Patent [19]
Fujita et al.

[11] Patent Number: 5,850,223
[45] Date of Patent: *Dec. 15, 1998

[54] EDITING THREE-DIMENSIONAL VERTEX DATA WITH UNDO FACILITY

[75] Inventors: Takushi Fujita; Mitsuaki Fukuda; Chikako Matsumoto; Masaaki Oota; Hitoshi Matsumoto, all of Kawasaki; Shuro Shindo, Inagi; Waku Ooe, Inagi; Yuichi Nagai, Inagi, all of Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 536,757

[22] Filed: Sep. 29, 1995

[30] Foreign Application Priority Data

Mar. 10, 1995 [JP] Japan .................................. 7-051306
Aug. 18, 1995 [JP] Japan .................................. 7-210871

[51] Int. Cl.⁶ .................................................. G06T 17/40
[52] U.S. Cl. ............................................................ 345/420
[58] Field of Search ........................... 345/119–121, 133, 345/419–421, 433

[56] References Cited

U.S. PATENT DOCUMENTS

| | | | |
|---|---|---|---|
| 5,101,436 | 3/1992 | DeAguiar et al. .................. | 345/433 X |
| 5,504,845 | 4/1996 | Vecchione ................................. | 345/419 |
| 5,513,309 | 4/1996 | Meier et al. ............................. | 345/339 |
| 5,561,747 | 10/1996 | Crocker et al. ........................ | 345/419 |
| 5,561,748 | 10/1996 | Niu et al. ................................. | 345/420 |
| 5,561,749 | 10/1996 | Schroeder ................................ | 345/420 |
| 5,613,049 | 3/1997 | Brechner et al. ....................... | 345/420 |
| 5,623,583 | 4/1997 | Nishino ................................... | 345/420 |

FOREIGN PATENT DOCUMENTS 2-19975 12/1990 Japan .
6-223146 8/1994 Japan .

Primary Examiner—Anton Fetting
Attorney, Agent, or Firm—Staas & Halsey

[57] ABSTRACT

In an interactive editing apparatus, a three-dimensional object to be edited is a set of polygonal surfaces which are arranged in a three-dimensional space and have the same number of sides. These polygonal surfaces are arranged on the three-dimensional space to display on a perspective view, the sides of the polygonal surfaces are linearly enveloped to express a polygonal three-dimensional object. When a user edits any one of vertex positions, data regarding the edited vertex and associated other vertex positions are updated. Further in the interactive editing apparatus, data regarding vertexes and faces of the object are managed using data cells, and shape data before the last editing are stored in the data cells together with present shape data, whereby an undo function is realized.

9 Claims, 24 Drawing Sheets

20 : (MENU BAR)
23a: (RING SELECTION/MOVEMENT BUTTON)
23b: (RING EXTENSION/REDUCTION BUTTON)
23c: (RING ROTATION BUTTON)
23d: (VERTEX MOVEMENT BUTTON)
23e: (VERTEX ADDITION BUTTON)
23f: (VERTEX DELETION BUTTON)
23g: (RING MOVEMENT DIRECTION SWITCHING BUTTON)
23h: (VIEW POINT MOVEMENT BUTTON)
23i: (ZOOM VOLUME)
24 : (RING)
24a: (RING IN SELECTION)
25 : (MOUSE CURSOR)
26 : (COORDINATE AXIS)
27 : (CIRCUMSCRIBED RECTANGLE)
28 : (EDITING BUTTON)

FIG. 5

| POLYGON | D1: LINK TO RING DATA |
|---|---|
| RING | D2: LINK TO ADJACENT RING |
| | D3: LINK TO VERTEX DATA |
| | D4: RING COORDINATE SYSTEM DEFINITION MATRIX (RING POSITION, DIRECTION) |
| | D5: CIRCUMSCRIBED RECTANGLE DATA (RING COORDINATE SYSTEM) |
| | D6: SELECTION STATE (ON/OFF) |
| VERTEX | D7: VERTEX POSITION COORDINATE (RING COORDINATE SYSTEM) |
| | D8: VERTEX POSITION COORDINATE (SCREEN COORDINATE SYSTEM) |
| OTHER | D9: CAMERA COORDINATE DEFINITION MATRIX |

FIG. 7

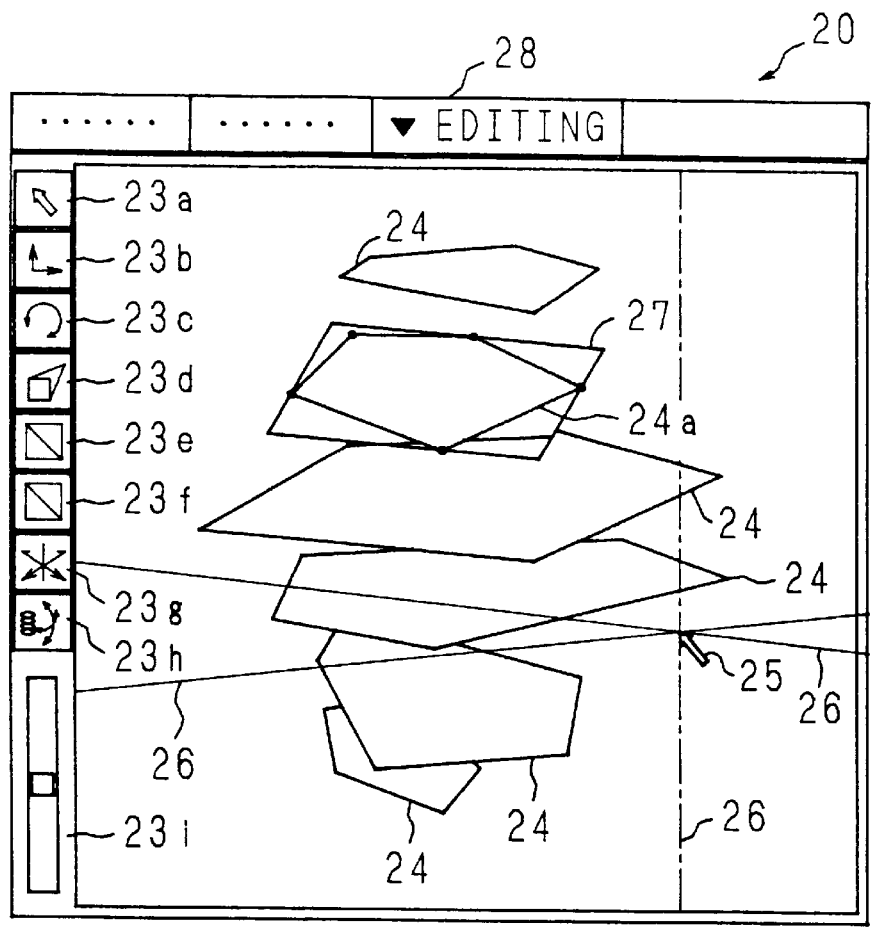

20 : (MENU BAR)
23a: (RING SELECTION/MOVEMENT BUTTON)
23b: (RING EXTENSION/REDUCTION BUTTON)
23c: (RING ROTATION BUTTON)
23d: (VERTEX MOVEMENT BUTTON)
23e: (VERTEX ADDITION BUTTON)
23f: (VERTEX DELETION BUTTON)
23g: (RING MOVEMENT DIRECTION SWITCHING BUTTON)
23h: (VIEW POINT MOVEMENT BUTTON)
23i: (ZOOM VOLUME)
24 : (RING)
24a: (RING IN SELECTION)
25 : (MOUSE CURSOR)
26 : (COORDINATE AXIS)
27 : (CIRCUMSCRIBED RECTANGLE)
28 : (EDITING BUTTON)

FIG. 15A

| ITEM | KIND OF DATA CELL | |
| --- | --- | --- |
| | POLYGON DATA CELL | RING DATA CELL |
| 206 LIST POINTER | POINTER FOR CONSTITUTING DATA CELL LIST | |
| 205 CHANGE FLAG | FLAG(1:SET/0:RESET) | |
| 201 PRESENT VALUE STORING PART | POINTER TO POLYGON BOTH END RING | POINTER TO ADJACENT RING<br>POINTER TO RING VERTEX LIST<br>POINTER TO RING FACE LIST<br>SELECTION STATE FLAG<br>COORDINATE CONVERSION FORMULA (RING COORDINATE SYSTEM→POLYGON COORDINATE SYSTEM)<br>RING CIRCUMSCRIBED FRAME DISPLAY DATA |
| 202 PRECEDING VALUE STORING PART | SAME AS ITEM OF EACH DATA CELL IN PRESENT VALUE STORING PART 201 | |
| 203 INVARIANT VALUE STORING PART | POLYGON DATA PRESERVE ADDRESS | RING DATA PRESERVE ADDRESS |
| 204 TEMPORARY VALUE STORING PART | | TEMPORARY SELECTION FLAG |

FIG. 15B

| ITEM | KIND OF DATA CELL | |
|---|---|---|
| | VERTEX DATA CELL | FACE DATA CELL |
| LIST POINTER | POINTER FOR CONSTITUTING DATA CELL LIST | |
| CHANGE FLAG | FLAG(1:SET/0:RESET) | |
| PRESENT VALUE STORING PART | POINTER TO LEFT-RIGHT ADJACENT VERTEX<br>VERTEX POSITION COORDINATE<br>(RING COORDINATE SYSTEM, POLYGON COORDINATE SYSTEM, VIEW POINT COORDINATE SYSTEM)<br>NORMAL VECTOR<br>WIRE FRAME DISPLAY DATA | POINTER TO LEFT-RIGHT ADJACENCY<br>POINTER TO EACH VERTEX IN FACE<br>NORMAL VECTOR<br>SMOOTH SHADING FLAG<br>WIRE FRAME DISPLAY DATA |
| PRECEDING VALUE STORING PART | SAME AS ITEM OF EACH DATA CELL IN PRESENT VALUE STORING PART 201 | |
| INVARIANT VALUE STORING PART | VERTEX DATA PRESERVE ADDRESS | FACE DATA PRESERVE ADDRESS |
| TEMPORARY VALUE STORING PART | | |

1st STATE

↓ EDITING

2nd STATE

↓ EDITING

3rd STATE

UNDO PROCESSING
←---------
--------→
UNDO PROCESSING

4th STATE

FIG. 20A
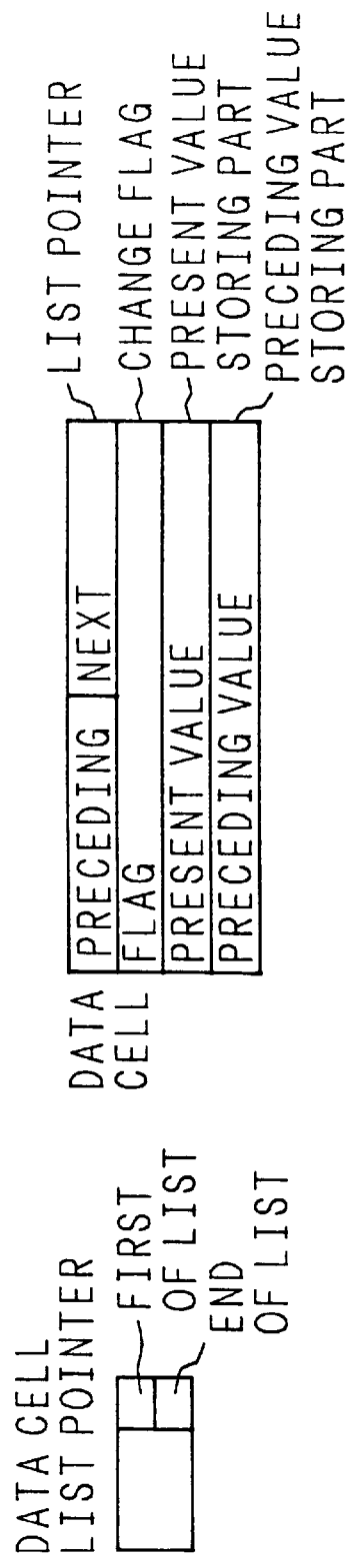
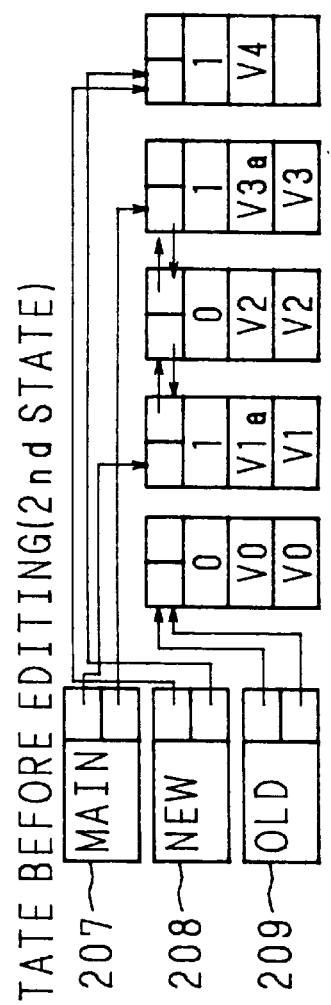

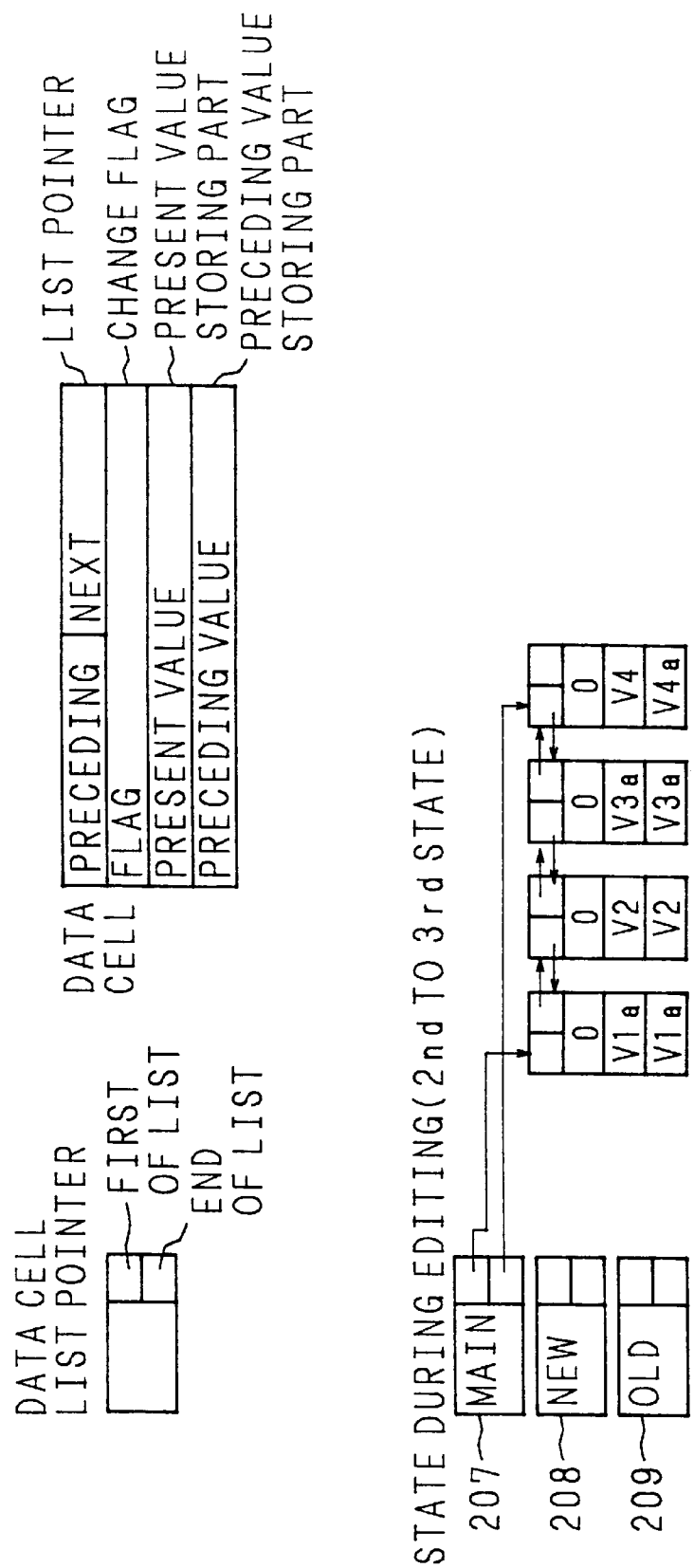

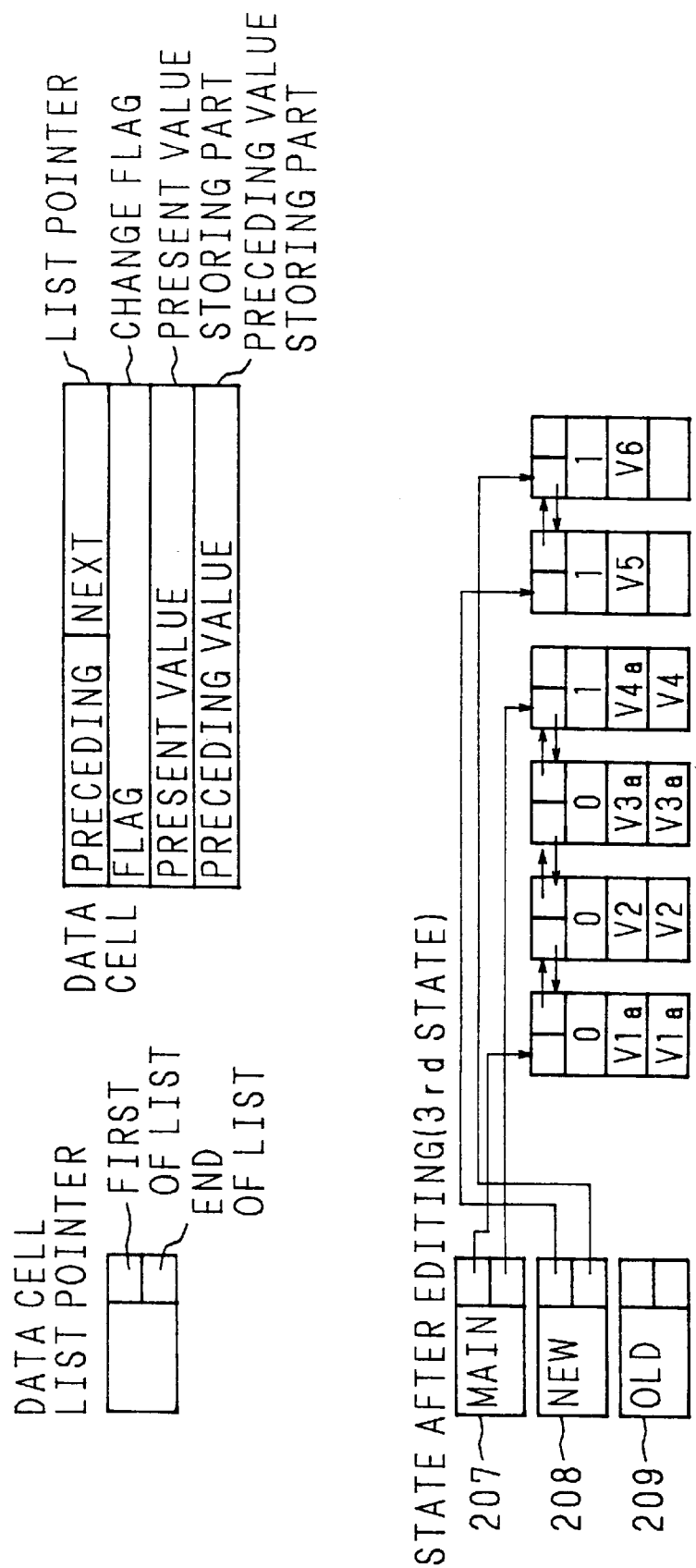

FIG. 20D
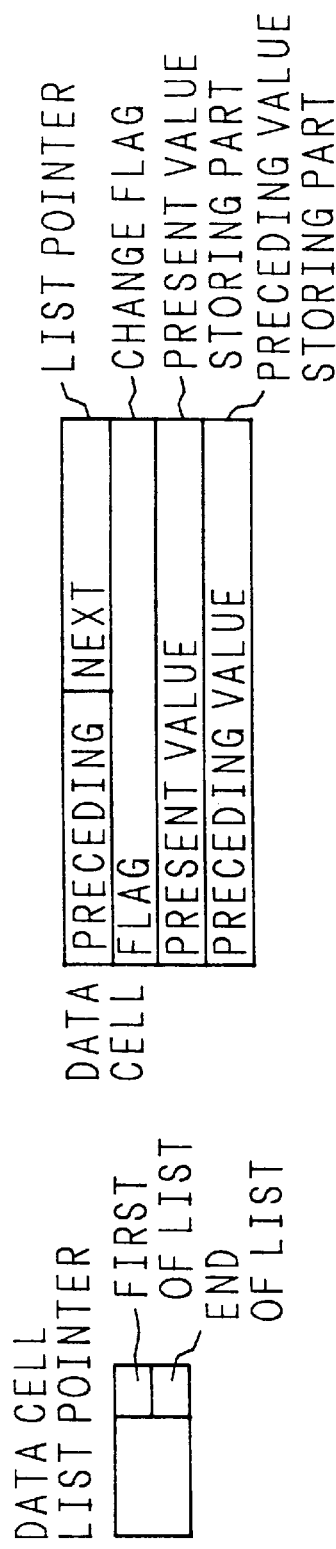
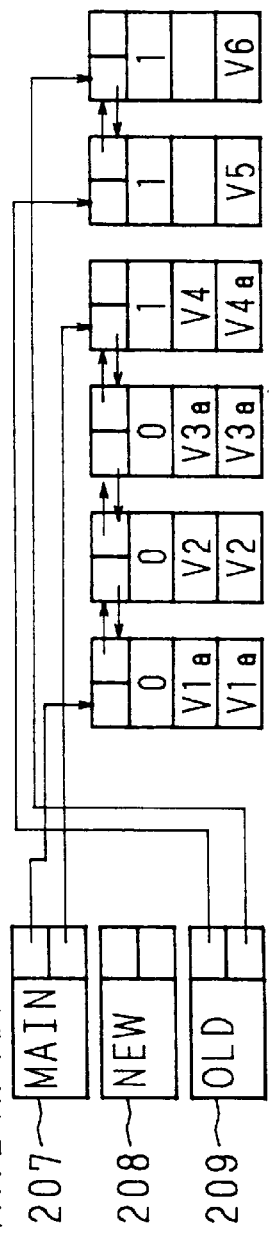

EDITING THREE-DIMENSIONAL VERTEX DATA WITH UNDO FACILITY

BACKGROUND OF THE INVENTION

1. Field of the Invention

The present invention relates to an apparatus for editing the configuration of a three-dimensional object through interaction with a user.

2. Description of Related Art

In many apparatuses for editing the configuration of a three-dimensional object, the object is displayed on a screen of a display and a user inputs editing instructions to edit the object by manipulating a mouse or the like. Various methods for performing such editing have been proposed.

Three drawings showing the shape of the object such as a front view, a side view and a plan view are displayed on the screen at the same time, the user instructs to edit the three-dimensional object in at least two of the three drawings. For instance, if the three-dimensional object is to be moved, the user designates the three-dimensional object in one of the drawings and drags the three-dimensional object, whereby the three-dimensional object is moved parallel to the plane of the view. Hence, to move the object three-dimensionally, the object must be moved by similar dragging with the mouse in the other drawings. Further, since the plurality of the drawings show the same point, it is difficult to intuitively grasp the relationship between the displayed pictures relative to each other.

The three-dimensional object may be expressed with a wire frame as a polygonal configuration and the wire frame is edited in accordance with an instruction from the user. However, since the wire frame expresses the three-dimensional object, if the three-dimensional object has a complex shape, it is difficult to immediately grasp the correct shape of the object.

The three-dimensional object may be expressed with sides connecting vertexes as a polygonal configuration and the vertexes are edited independently of each other in accordance with an instruction from the user. However, since the vertexes of the three-dimensional object are edited independently of each other, it is difficult to determine a general editing strategy, which eventually requires much labor for editing.

Meanwhile, with an interactive three-dimensional configuration editing apparatus using a computer display, it is desirable to edit through trial-and-error while confirming a result of changes in data on a graphic display. Hence, an undo function, that is, a function of cancelling a precedent editing is desired.

FIG. 1 is a block diagram showing a basic structure of a conventional interactive three-dimensional configuration editing apparatus which has an undo function. The apparatus includes instruction receiving means 111 for receiving an instruction from a user; shape information storing means 112 for storing shape data during editing; shape displaying means 113 for displaying a shape which is expressed in accordance with the shape data stored in the shape information storing means 112; editing means 114 for editing in accordance with an instruction received by the instruction receiving means 111; undo information storing means 117 for storing information which is needed to restore shape data as it was immediately before the last editing; and undo processing means 116 for restoring shape data as it was immediately before the last editing based on the information which is stored in the undo information storing means 117.

During editing, the editing means 114 edits the shape data stored in the shape information storing means 112 in accordance with an instruction received by the instruction receiving means 111 and stores information which is needed to restore shape data as it was immediately before the last editing in the undo information storing means 117 depending on the type of editing to be performed. The shape displaying means 113 then displays a shape which is expressed in accordance with edited shape data. During undoing, the undo processing means 116 performs undo in accordance with the information which is stored in the undo information storing means 117 depending on the type of the last editing, to thereby restore the shape data as it was immediately before the editing. The shape displaying means 113 then displays a shape which is expressed in accordance with restored shape data.

To express a complex three-dimensional structure, many of the three-dimensional configuration editing apparatuses must handle data which has a complex structure using a number of pointers and therefore must have various editing functions suitable to such data. To perform an undo function, such a three-dimensional configuration editing apparatus must be able to correctly restore structural data which is expressed by using pointers.

In the conventional apparatus having such a structure as that shown in FIG. 1, information which is needed to restore shape data as it was immediately before editing is stored in the undo information storing means 117 depending on the type of the editing and undo processing which is suitable to the type of the editing is performed. In this apparatus, it is necessary to define undo processing for each one of editing types (e.g., to move, to add and to delete a vertex), which makes a program complex. This leads to a deterioration in the processing efficiency and imposes a constraint on the editing functions.

SUMMARY OF THE INVENTION

An object of the present invention is to provide a three-dimensional configuration editing apparatus which efficiently edits the configuration of a three-dimensional object.

Another object of the present invention is to provide a three-dimensional configuration editing apparatus which performs undo processing in the same sequence for all types of editing, prepares for such undo processing and realizes undo functions which are suitable to various types of editing.

The above and further objects and features of the invention will more fully be apparent from the following detailed description with accompanying drawings.

BRIEF DESCRIPTION OF THE DRAWINGS

FIG. 5 is an explanatory diagram showing the contents of data in the first preferred embodiment;

FIG. 7 is a schematic view of an editing screen in the first preferred embodiment;

FIGS. 15A and 15B are views showing a specific example of an inner structure of a data cell in the second preferred embodiment;

FIGS. 20A to 20D are views showing an example of a change in inner data due to editing of a shape in the second preferred embodiment.

DESCRIPTION OF THE PREFERRED EMBODIMENTS

In the following, the present invention will be described with reference to drawings which show preferred embodiments.

<First Preferred Embodiment>

Figure 1:
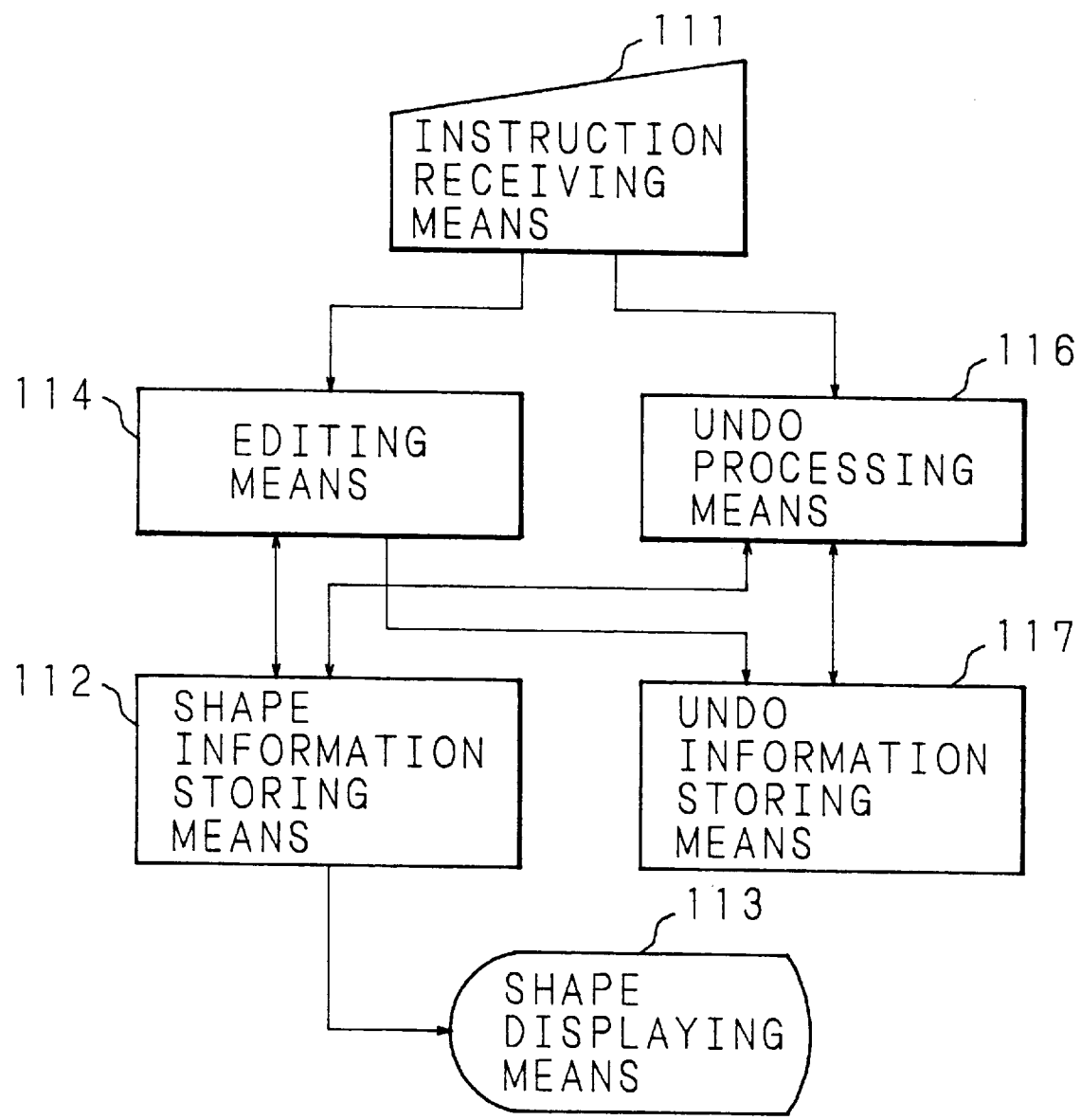
FIG. 1 is a view showing a structure of a conventional three-dimensional configuration editing apparatus.
Figure 2:
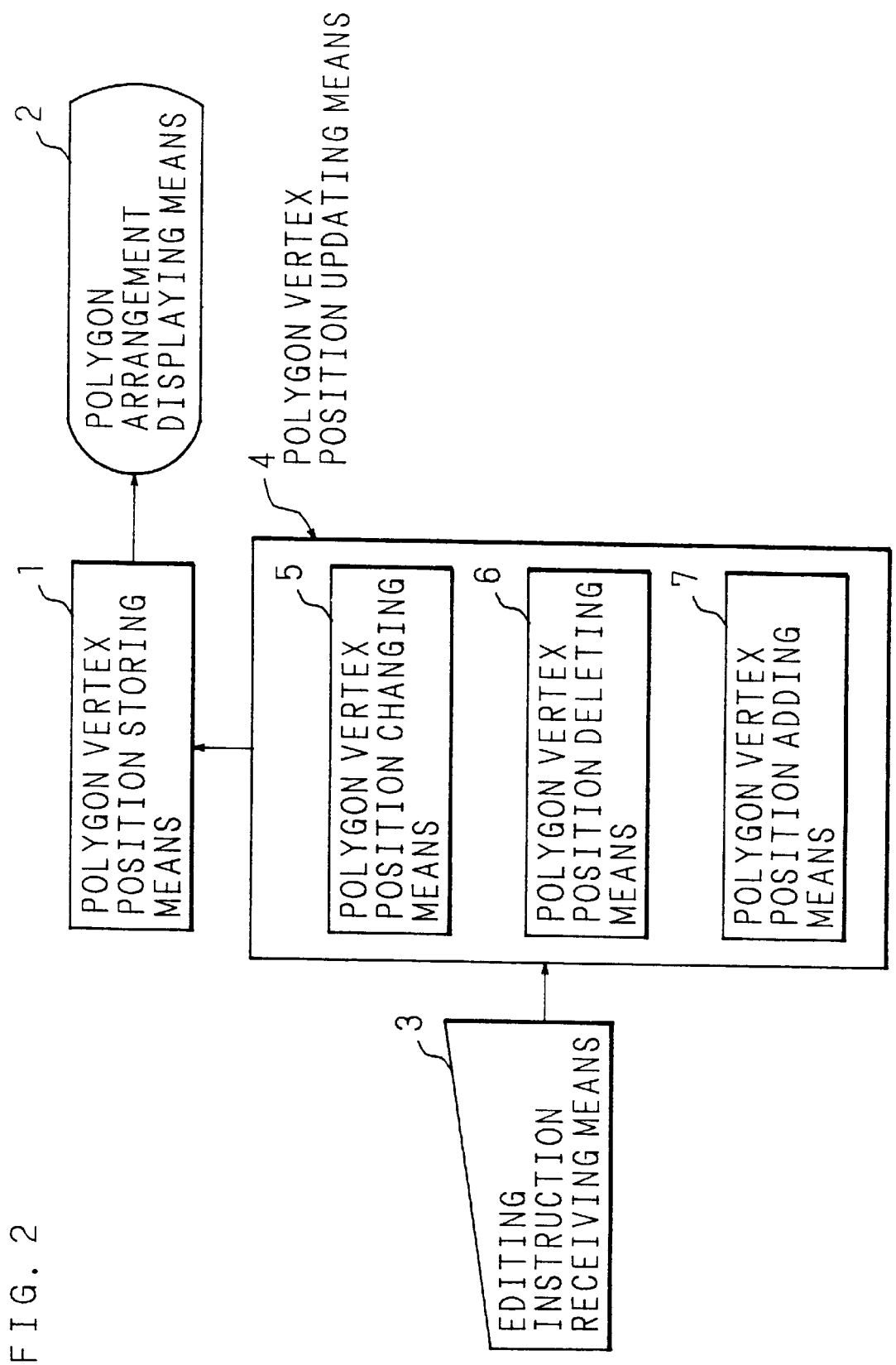
FIG. 2 is an explanatory diagram describing principles of a first preferred embodiment of the present invention.

FIG. 2 is a block diagram showing a basic structure of a three-dimensional configuration editing apparatus according to a first preferred embodiment of the present invention. The three-dimensional configuration editing apparatus of the first preferred embodiment has polygon vertex position storing means 1 for storing correlatively positions of all vertexes of polygonal surfaces which are arranged in a three-dimensional space and have the same number of sides while correlating the positions of all vertexes, polygon arrangement displaying means 2 for connecting correlatively stored positions in an order to display the arrangement of resulting polygonal surfaces on a perspective view, editing instruction receiving means 3 for receiving an instruction from a user to edit a polygonal three-dimensional object which is expressed by linearly enveloping the sides of the polygonal surfaces, and polygon vertex position updating means 4 for updating stored information regarding positions of a vertex which is designated by an editing instruction and other vertexes which are related to the vertex.

The polygon vertex position updating means 4 has polygon vertex position changing means 5 for changing stored information regarding the position of a vertex which is designated by an editing instruction or stored information regarding positions of this vertex and another vertex which belongs to the same polygonal surface with this vertex, polygon vertex position deleting means 6 for deleting stored information regarding positions of a vertex which is designated by an editing instruction and a vertex of other polygonal surface correlating to this vertex or stored in formation regarding positions of this vertex and another vertex which belongs to the same polygonal surface with this vertex, and polygon vertex position adding means 7 for creating vertexes at a position which is designated by an editing instruction and a position in other polygonal surface correlating to this vertex or a position within the arrangement of the polygonal surfaces designated by an editing instruction and for adding the position of a created vertex to the already stored information positions.

A three-dimensional object to be edited is combination of polygonal surfaces or simply, polygons, which are arranged in a three-dimensional space and have the same number of sides, and the polygon vertex position storing means 1 stores positions of all vertexes of each polygonal surface. During editing, in accordance with the information stored in the polygon vertex position storing means 1, these polygonal surfaces are arranged in a three-dimensional space and displayed on a perspective view by the polygon arrangement displaying means 2. Hence, a user can intuitively and accurately grasp the shape of the three-dimensional object from this one displayed view. If sides of the polygonal surfaces linearly enveloped to each other to express a three-dimensional polygonal object and the expressed object is displayed, a user can even more easily and accurately recognize the shape of the object. When a user edits the position of any vertex through the editing instruction receiving means 3, the polygon vertex position updating means 4 updates the information regarding the vertex position and information regarding the position of another vertex related to the vertex which are stored in the polygon vertex position storing means 1.

The polygon vertex position changing means 5 updates the information stored in the polygon vertex position storing means 1 regarding one or more vertexes designated by an editing instruction, or changes at the same time information regarding the position of a vertex belonging to one or more polygonal surfaces designated by the editing instruction. For example, one or more vertexes designated by the user are moved, whereby all polygonal surfaces including these vertexes are deformed (movement of the vertexes are limited within this plane since the polygonal surfaces are flat planes). Alternatively, one or more polygonal surfaces designated by the user are moved, rotated, extended or reduced. The polygon vertex position deleting means 6 deletes the position of a vertex designated by the editing instruction and the position of a vertex of another polygonal surface correlating to the vertex all at one time from information regarding the vertex positions which is stored in the polygon vertex position storing means 1, or deletes the positions of the vertexes which belong to the polygonal surface which is designated by the editing instruction all at one time from the information which is stored in the polygon vertex position storing means 1. In other words, if any one of vertexes of a polygonal surface is deleted, a vertex correlating to the vertex to be deleted of all other polygonal surfaces are deleted at the same time. Alternatively, a polygonal surface designated as the one to be deleted is deleted.

The polygon vertex position adding means 7 creates a vertex at a position which is designated by an editing instruction and at a correlating position of another polygonal surface and adds the positions of these vertexes to the information which is stored in the polygon vertex position storing means 1. Alternatively, the polygon vertex position adding means 7 creates vertexes of a new polygonal surface at positions within the arrangement of the polygonal surfaces designated by an editing instruction and adds the positions of these vertexes to the information which is stored in the polygon vertex position storing means 1. For example, when any one of sides of a polygonal surface is clicked, a new vertex is added at the clicked position, and a new vertex is added to a correlating position of another polygonal surface at the same time. Alternatively, when a user designates one of the polygonal surfaces and instructs to add a polygonal surface, a polygonal surface which is identical to the one designated by the user is inserted at a position between this polygonal surface and one of the adjacent polygonal surfaces (precedent and subsequent polygonal surfaces in the arrangement of the polygonal surfaces).

Figure 3:
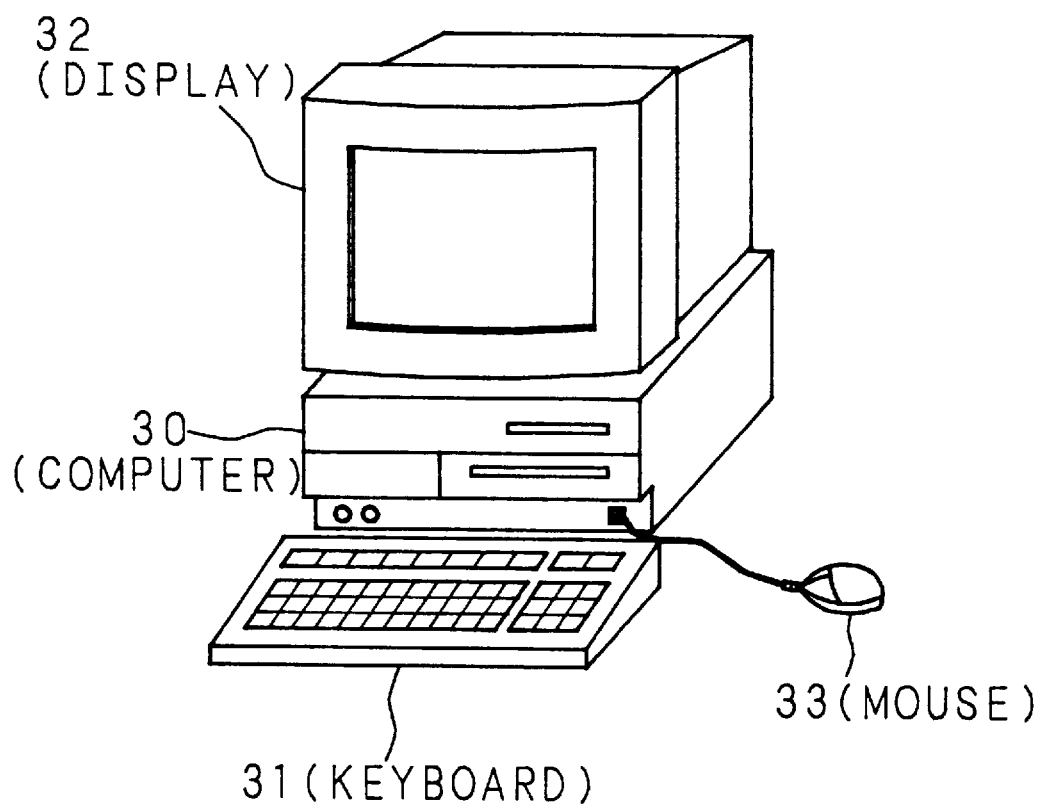
FIG. 3 is a view showing an appearance according to the first preferred embodiment and a second preferred embodiment of the present invention.

FIG. 3 is a view showing the appearance of the three-dimensional configuration editing apparatus according to the first preferred embodiment (First example). In FIG. 30, denoted at 30 is a computer. A keyboard 31 and a display 32 are connected to the computer 30. A mouse 33 is operated by a user. Editing of the shape of a three-dimensional object to create a perspective view in a three-dimensional space is performed in the computer 30 by manipulating the mouse 33. A perspective image thus created is displayed on a screen of the display 32.

Figure 4:
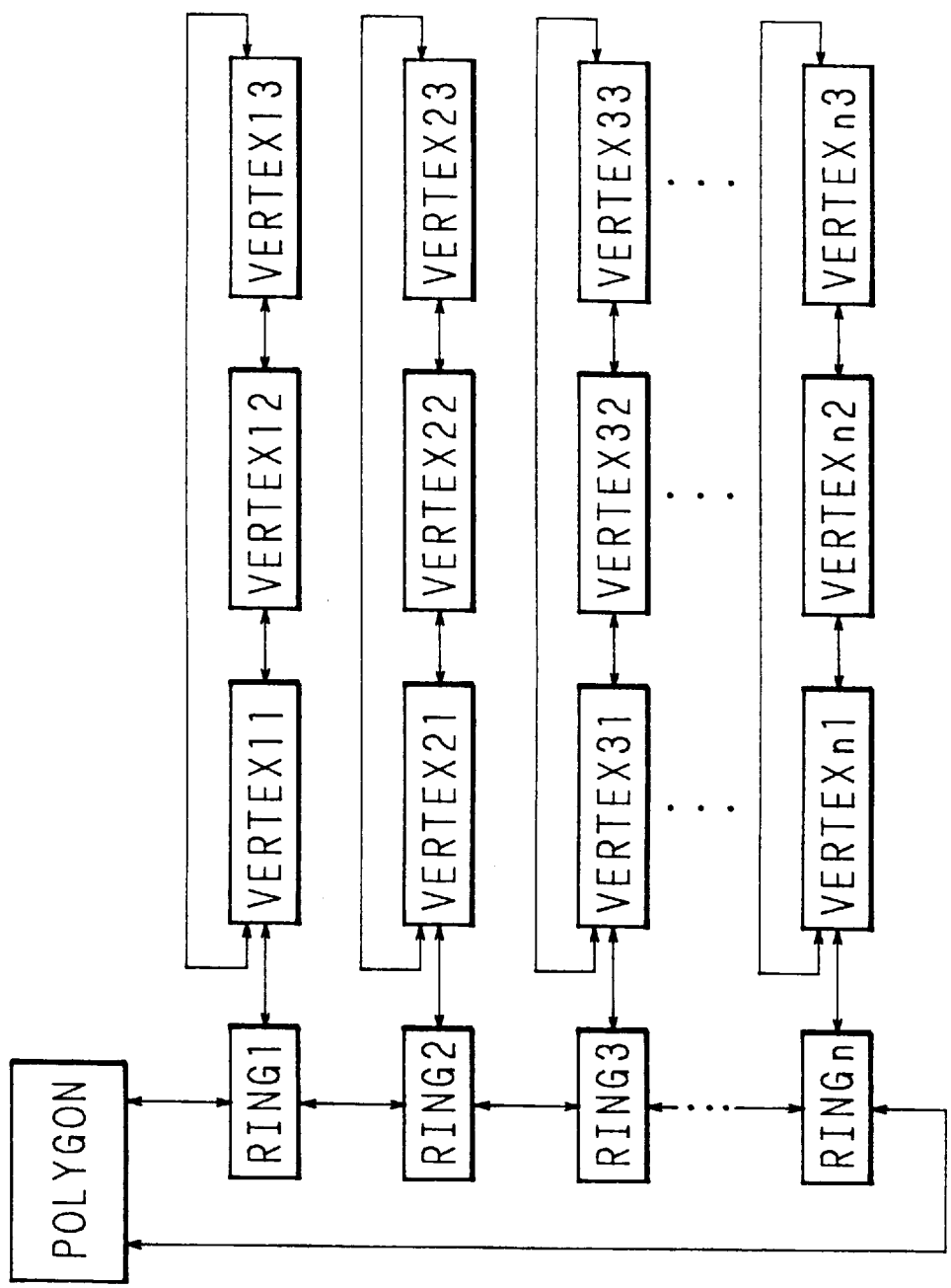
FIG. 4 is an explanatory diagram showing a data structure in the first preferred embodiment.

FIG. 4 is an explanatory diagram showing a data structure in the first example, and FIG. 5 is an explanatory diagram showing the contents of data in the first example. Polygon data regarding a three-dimensional object to be edited contains link data D1 to the beginning and the end of a list (polygonal surfaces which are arranged in a three-dimensional space and have the same number of sides). Each ring data is formed by link data D2 to adjacent rings, link data D3 to vertex data which expresses a vertex position, matrix data D4 which expresses the position and the direction of a ring, rectangle data D5 which circumscribe the ring, and data D6 which expresses whether the ring is selected or not. Further, each vertex data includes coordinate data D7 of a ring vertex in a ring coordinate system and coordinate data D8 of a ring vertex in a plane coordinate system (so far data regarding vertexes). As other data, matrix data D9 defining camera coordinate is prepared.

Figure 6:
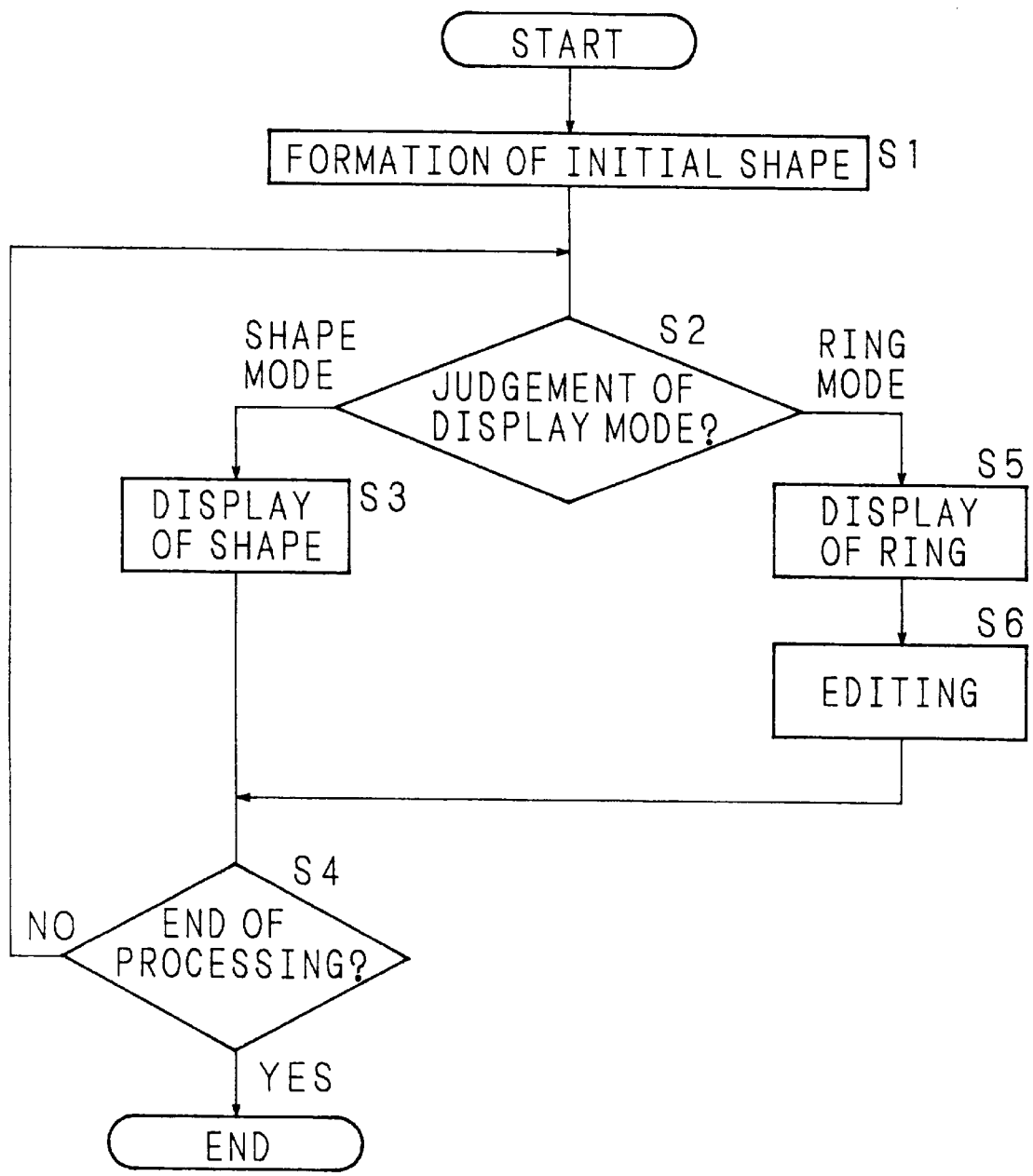
FIG. 6 is a flow chart describing the sequence of an operation in the first preferred embodiment.

FIG. 6 is a flow chart showing the contents of processing in the first example. An operation in the first example will be described while referring to FIG. 6. First, a user designates parameters for a three-dimensional object to create an initial shape (Step S1). At this point, the user also designates parameters regarding the number of rings, the number of vertexes of the rings (common to all rings), the outer size of the three-dimensional object (vertical length, horizontal length, height) and the shape of the three-dimensional object (e.g., sphere, column, prism).

Whether the display mode is a shape mode or a ring mode is then judged (Step S2). If the display mode is the shape mode, the shape is displayed on the screen of the display 32. To be precise, a three-dimensional view of the polygon is displayed with one perspective view (Step S3) and the sequence proceeds to Step S4. On the other hand, if the display mode is the ring mode, rings are displayed on the screen of the display 32. To be precise, an arrangement of polygonal surfaces which are arranged in a three-dimensional space and have the same number of sides and vertexes is displayed with one perspective view (Step S5). Following this, the contents about the rings are edited in accordance with an editing instruction inputted from the user via the mouse 33 (Step S6) and the sequence proceeds to Step S4. Whether to end the processing is judged at Step S4. The sequence returns to Step S2 if the processing is not to be ended yet.

Figure 8:
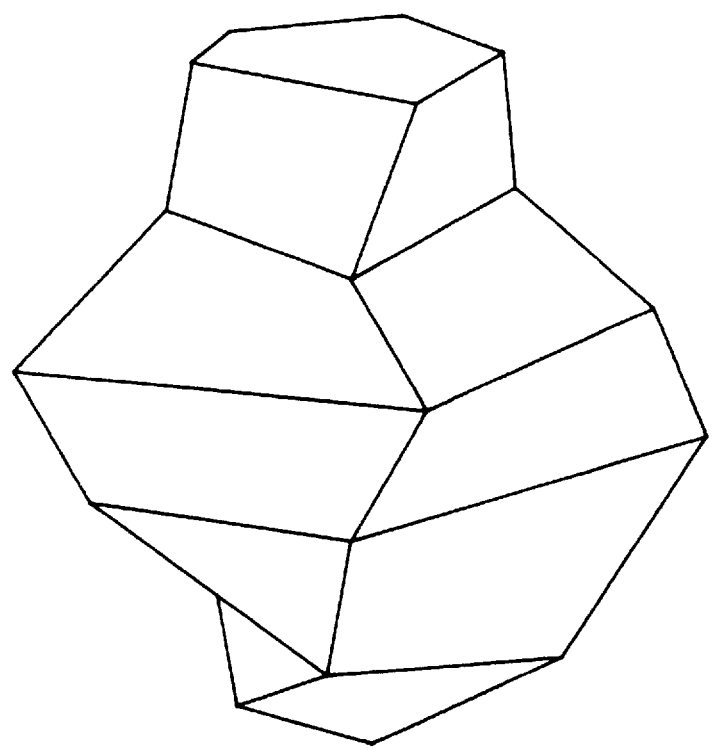
FIG. 8 is a schematic view of a displayed shape in the first preferred embodiment.

FIG. 7 is a schematic view of an editing screen displaying the contents of the rings, and FIG. 8 is a schematic view of an example of a displayed shape of the three-dimensional polygonal view. For example, the user initially creates a pentagonal prism, one of three-dimensional objects (Step S1), displays the view with rings (See FIG. 7) (Step S5) and edits the contents of the displayed view (Step S6). The result of editing is confirmed with the display of the shape (see FIG. 8)(Step S3).

Figure 9:
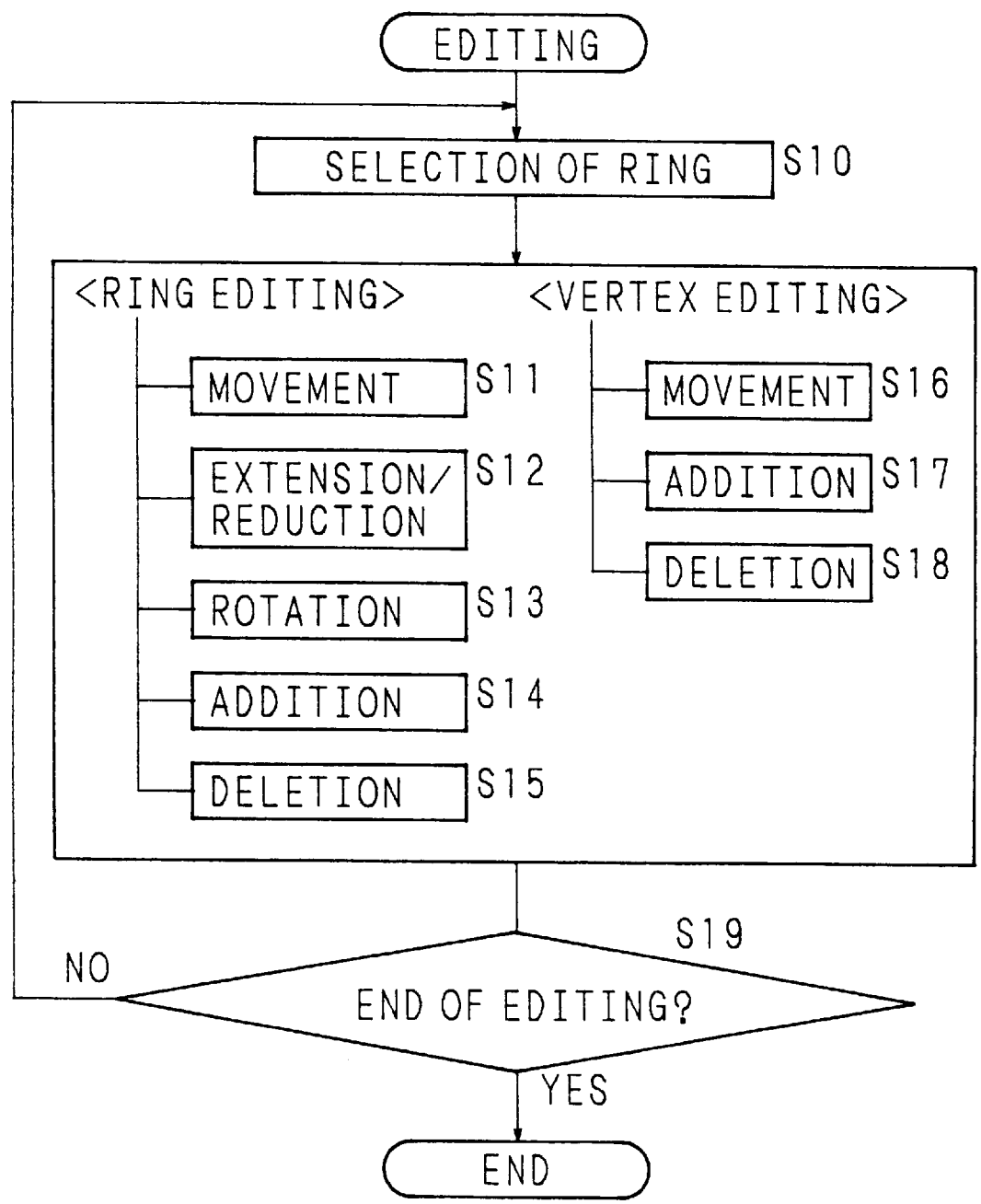
FIG. 9 is a flow chart describing editing in the first preferred embodiment.

FIG. 9 is a flow chart describing editing of a three-dimensional polygonal view (Step S6 in FIG. 6). In the following, a specific operation in the first example will be described referring to FIGS. 9 and 7.

This editing is started with a click on a predetermined button in a menu bar 20 by the mouse shown in FIG. 7. Arranged on the left side of the screen in a vertical line are buttons 23*a*, 23*b*, 23*c*, 23*d*, 23*e*, 23*f*, 23*g* and 23*h* and a volume 23*i*. Displayed on the right of the buttons is one perspective view arranging polygonal surface rings 24 (six rings in total in FIG. 7) which have the same number of sides and vertexes in a three-dimensional space (ring display). Each ring 24 is displayed with shading and vertexes of the rings 24 are arranged on the same plane which is defined by the matrix data D4 shown in FIG. 5.

Also displayed on the screen are three coordinate axes 26 which cross perpendicular to each other in the three-dimensional space. The coordinate axes 26 move as a mouse cursor 25 moves in such a manner that a point designated by the mouse cursor 25 coincides with an intersection of the three coordinate axes 26.

To move the rings 24, the user clicks on the ring selection/movement button 23*a*, the ring extension/reduction button 23*b* or the ring rotation button 23*c* with the mouse to enter a ring editing mode, and starts mouse dragging on the ring 24 to be moved (Step S10). Alternatively, the user selects in advance the ring 24 to be moved (more than one ring may be moved) and starts mouse dragging on the ring 24 to be moved.

More than one rings 24 may be selected as rings to be moved at a time. The values of the selection state data D6 regarding the selected rings 24 are reversed ON, and a rectangle 27 circumscribing the selected rings 24 (the second ring 24 from the top in FIG. 7) is displayed. The rectangle 27 is displayed using the data D5 regarding the rectangle circumscribing the ring and the matrix data D9 defining camera coordinate. The selected rings 24 themselves are displayed with wire frames (See FIG. 7).

The data D4 expressing the position of the selected rings 24 is updated on a real time base after mouse dragging starts, and these selected rings 24 are moved parallel to any one of the coordinate axes 26 or parallel to a coordinate plane which is defined by two coordinate axes (Step S11). Whether any of the axes or the planes is to be selected is determined by the ring movement direction switching button 23*g*.

To extend or reduce the ring 24, the ring extension/reduction button 23*b* is clicked with the mouse to enter a ring extension/reduction mode. The ring 24 to be extended or reduced is selected by clicking with the mouse, and mouse dragging is started on a side or a vertex of the rectangle 27 circumscribing the ring 24 (Step S10). When mouse dragging is started on a side of the rectangle 27, the selected ring 24 is extended or reduced in one direction from an opposite side or a center point of the rectangle. When mouse dragging is started on a vertex, the selected ring 24 is extended or reduced similarly as viewed from an opposite vertex or a center point of the rectangle (Step S12).

During extension and reduction, the circumscribed rectangle data D5, the ring coordinate system vertex position coordinate data D7 and the plane coordinate system vertex position coordinate data D8 are updated on a real time basis. Further, when more than one of the rings 24 are selected, a side or a vertex of the rectangle 27 circumscribing any one of the rings 24 is dragged, whereby all selected rings 24 are extended or reduced at the same time.

To rotate the ring 24, the ring rotation button 23c is clicked with the mouse to enter a ring rotation mode. The ring 24 to be rotated is selected by clicking with the mouse, and mouse dragging is started on a side or a vertex of the rectangle 27 circumscribing the ring 24 (Step S10). When mouse dragging is started on a side, the selected ring 24 is rotated about a line which passes through an opposite side or a center point of the rectangle and which is parallel to the dragged side. When mouse dragging is started on a vertex, the selected ring 24 is rotated about a line which passes through an opposite vertex or a center point of the rectangle and which is perpendicular to the rectangular surface (Step S13). During rotating, the data D4 of a ring coordinate system definition matrix is updated on a real time basis. Further, when more than one of the rings 24 are selected, all selected rings 24 are rotated at the same time by dragging any one of the selected rings 24.

To add a ring 24, the ring 24 to be added is selected in advance by clicking with the mouse (Step S10). Next, an editing button 28 in the menu bar 20 is clicked with the mouse to open the menu (not shown), and an item "Add as Precedent Ring" or "Add as Subsequent Ring" is selected. As a result, a new ring 24 is created before or after the selected ring 24 (Step S14). The order of the rings 24 is determined in accordance with an order in a ring list shown in FIG. 4. The position, the direction and the coordinate of each vertex of the ring 24 to be added are determined by interpolating data values regarding the precedent and the subsequent rings 24, and data regarding the new ring 24 are inserted between data values of the precedent ring 24 and data values of the subsequent ring 24.

To delete a ring 24, the ring 24 to be deleted is selected in advance by clicking with the mouse (Step S10). Further, the editing button 28 in the menu bar 20 is clicked with the mouse to open the menu (not shown), and an item "Delete" is selected. As a result, data regarding the selected ring 24 are deleted and erased from the displayed picture (Step S15).

To deform the ring 24 by moving vertexes, after selecting the ring 24 to be deformed in advance by clicking with the mouse, the vertex movement button 23d is clicked with the mouse to enter a vertex movement mode, the ring 24 to be deformed is displayed with a wire frame (Step S10). Next, one of vertexes of the ring 24 which is displayed with a wire frame is dragged with the mouse to move the vertex (Step S16). The vertex dragged with the mouse is moved on a plane of the ring. The ring coordinate system vertex position coordinate data D7 and the plane coordinate system vertex position coordinate data D8 are updated on a real time basis. Further, when more than one of the rings 24 are selected, vertexes of the other rings 24 correlating to the dragged vertex are moved on a plane of each ring at the same time.

To deform the ring 24 by adding a vertex, after selecting the ring 24 to be deformed in advance by clicking with the mouse, the vertex addition button 23e is clicked with the mouse to enter a vertex addition mode, the ring 24 to be deformed is displayed with a wire frame (Step S10). Next, one of sides of the ring 24 which is displayed with a wire frame is clicked with the mouse to add a vertex at the mouse click position (Step S17). If mouse dragging is performed at this time, the added vertex is moved on a plane of the ring. The ring coordinate system vertex position coordinate data D7 and the plane coordinate system vertex position coordinate data D8 are updated on a real time basis. When the vertex is added, a vertex is added at the same position in each one of all the other rings 24. When more than one rings 24 are selected, vertexes of the other selected rings 24 correlating to the dragged vertex are moved on a plane of each ring at the same time. Data regarding the new vertex are obtained by interpolating data of the adjacent vertexes on the two sides, and inserted at a time to the same matrix position in a vertex matrix shown in FIG. 4.

To deform a ring 24 by deleting a vertex, after selecting the ring 24 to be deformed in advance by clicking with the mouse, the vertex deletion button 23f is clicked with the mouse to enter a vertex deletion mode, the ring 24 to be deformed is displayed with a wire frame (Step S10). Next, one of vertexes of the ring 24 which is displayed with a wire frame is clicked with the mouse to instruct deletion of the vertex (Step S18). Concurrently with this, correlating vertexes of the other selected rings 24 are deleted at the same time. Data of the deleted vertex are deleted from the same matrix position in the vertex matrix shown in FIG. 4.

The various types of editing described above can be repeatedly performed by selecting NO at Step S19. A result of editing is confirmed finally with a displayed shape as that shown in FIG. 8. During the various types of editing described above, any one of the operations of entering the editing mode and selecting a target ring 24 may be performed first.

As described above, according to the first example, the rings 24 to be edited is a set of polygonal surfaces which are arranged in a three-dimensional space and have the same number of sides. During editing, the polygonal surfaces are arranged in a three-dimensional space and displayed on a perspective view (See FIG. 7), a user can intuitively grasp the accurate shape of the ring 24 from this one perspective view. In addition, since a result of linearly enveloping sides of the polygonal surfaces of the ring 24 to each other is displayed (See FIG. 8), the user even more easily and accurately recognize the shape of the ring 24.

Further, when the user edits any of the rings 24 on the perspective view described above, the stored information regarding the positions of the vertexes are updated, and the stored information regarding the other associated rings 24 and the vertexes are updated automatically at the same time. Hence, it is possible to edit the shape of a three-dimensional object extremely easily and efficiently.

As described above, in the interactive three-dimensional configuration editing apparatus according to the first example, a three-dimensional space is expressed on one perspective view. When any one of the vertexes is edited on the perspective view, other associated vertexes are edited automatically. Hence, it is possible to edit the configuration of a three-dimensional object more efficiently.

<Second Preferred Embodiment>

Figure 10:
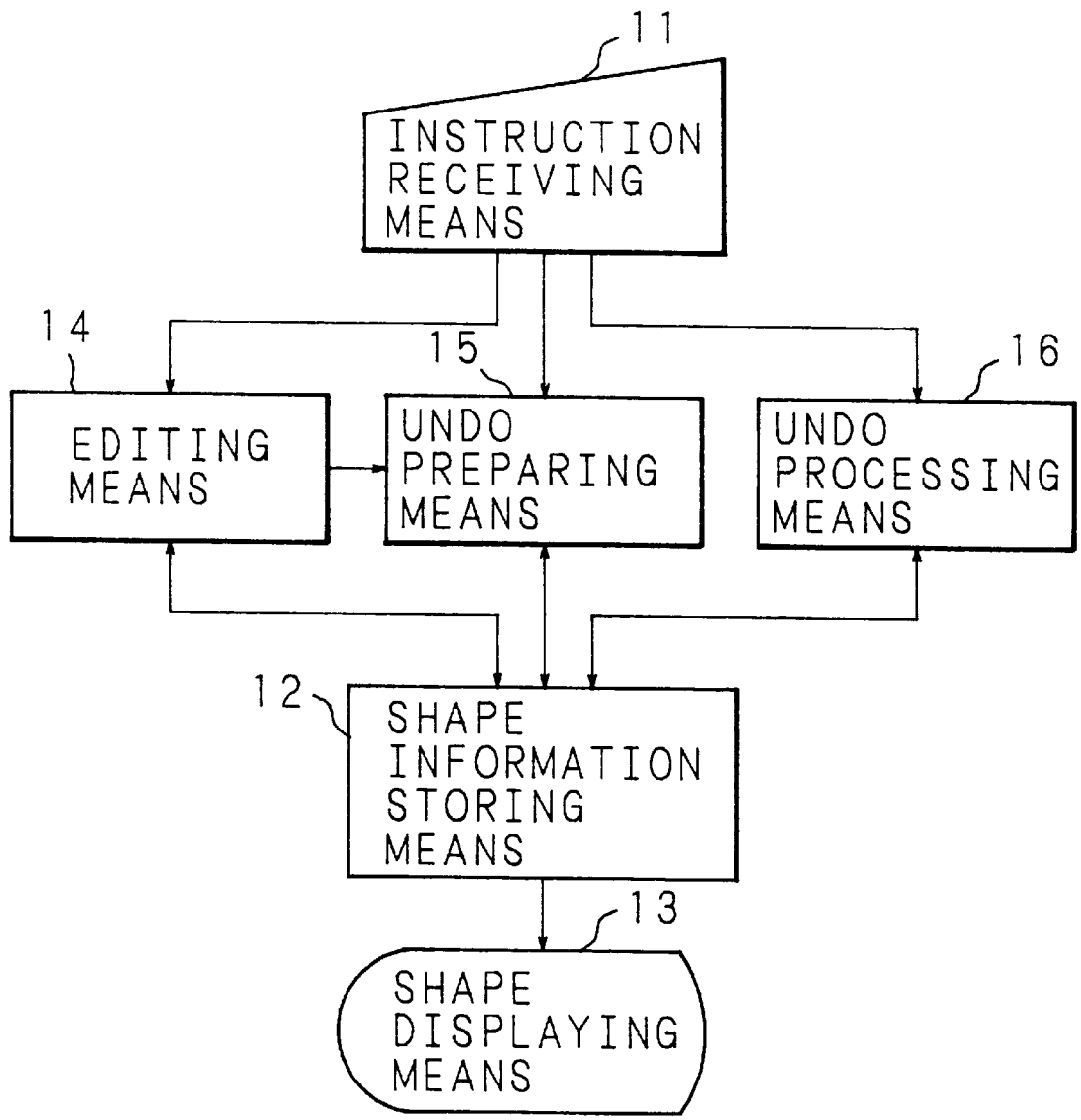
FIG. 10 is an explanatory diagram describing principles of the second preferred embodiment of the present invention.

FIG. 10 is a block diagram showing a basic structure of a three-dimensional configuration editing apparatus according to a second preferred embodiment of the present invention. The three-dimensional configuration editing apparatus has instruction receiving means 11 for receiving an instruction from a user, shape information storing means 12 for storing information for defining the present shape and information for restoring the shape as it was immediately before the last editing, shape displaying means 13 for displaying the present shape of an object, editing means 14 for editing a shape which is stored in the shape information storing means 12, undo preparing means 15 for recording information which is needed to restore the shape of the object as it was immediately before the processing when editing and undo processing are performed, and undo processing means 16 for restoring shape data as it was immediately before the last editing. Using the undo preparing means 15 and the undo processing means 16, undo processing is performed in a standardized sequence independently of the type of editing on which undo processing is to be performed and a data structure.

In the unit of a data cell which stores vertexes and faces forming a three-dimensional object, auxiliary data for editing, basic parameters regarding the object, etc., information regarding the shape is stored in the shape information storing means 12. Each data cell has a present value storing part for storing present data, a preceding value storing part for duplicating a value stored in the present value storing part as it was immediately before the last editing or undo processing and storing the value, a pointer for generating a data cell list, a pointer for a data cell list newly created by the last editing, a pointer for a data cell list which has existed even before the last editing, and a pointer for a data cell list which becomes unnecessary for defining the shape due to the last editing.

Further, each data cell includes a change flag for holding information expressing whether the contents of the present value storing part and the preceding value storing part of the data cell coincide with each other.

Still further, each data cell includes an invariant value storing part for storing information which does not change until the data cell is deleted once the data cell is created.

In addition, each data cell includes a temporary value storing part for storing information which is temporarily used to edit or display a shape.

FIGS. 11, 12A, 12B and 12C are views showing a data structure in the shape information storing means 12 which is shown in FIG. 10. Information regarding the shape of a three-dimensional object is stored using a data cell 200 which stores vertex data, face data and other data separately from each other.

Figure 11:
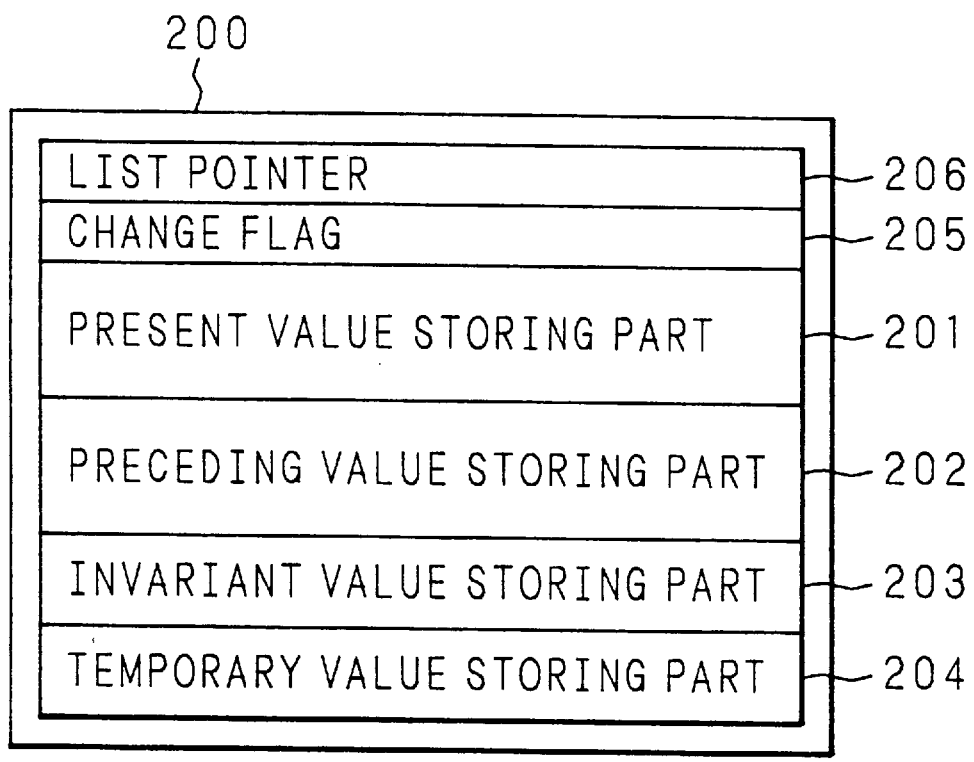
FIG. 11 is a view showing a data structure (inner structure of data cell) in shape information storing means in the second preferred embodiment.

As understood from the inner structure shown in FIG. 11 of the data cell 200, each data cell 200 includes a present value storing part 201 for storing a present value of data which may be changed due to editing, a preceding value storing part 202 for duplicating a value stored in the present value storing part 201 as it was immediately before the last editing and storing the value, an invariant value storing part 203 for storing data which does not change after the data cell is created, a temporary value storing part 204 for storing a temporary value, a change flag 205 indicating whether a value stored in the present value storing part 201 has changed due to the last editing, and a list pointer 206 for creating a list (data cell list) which shows a linkage of data cells 200.

Also disposed are a main data cell list pointer 207 (See FIG. 12A) designating a list of data cells (main data cell list) which has existed even before the last editing, a new data cell list pointer 208 (See FIG. 12B) designating a list of data cells newly created due to the last editing (new data cell list), and an old data list pointer 209 (See FIG. 12C) designating a list of data cells which made unnecessary for defining the shape due to the last editing (old data cell list).

When the instruction receiving means 11 receives an instruction to edit, the undo preparing means 15 deletes all data cells 200 which are included in a list which is designated by the old data list pointer 209 and inserts a list which is designated by the new data cell list pointer 208 into a list which is designated by the main data cell list pointer 207. With respect to those with the change flags 205 set among all data cells 200 which are included in the list designated by the main data cell list pointer 207, the undo preparing means 15 duplicates the contents of the present value storing part 201 into the preceding value storing part 202 and resets the change flags 205. The editing means 14 performs editing in response to the user's instruction received by the instruction receiving means 11. When data stored in the data cells 200 of the main data cell list are changed by the editing, the change flags 205 are set and the contents of the present value storing part 201 are changed. When a new data cell 200 is created as a result of the editing, the contents of the invariant value storing part 203 and the present value storing part 201 are set, the change flag 205 is set and the new data cell 200 is inserted in the new data cell list. When the editing makes the data cells 200 of the main data cell list unnecessary, those data cells 200 are deleted from the main data cell list and inserted into a deleted data cell list.

When the instruction receiving means 11 receives an undo instruction, the undo processing means 16 switches the new data cell list pointer 208 and the old data list pointer 209. Further, as to those with the change flags 205 set among all data cells 200 of all data cell lists, the contents of the present value storing part 201 and the contents of the preceding value storing part 202 are switched to each other.

When editing or undo processing is performed, the shape displaying means 13 displays the resulted shape of the object based on the contents of the main data cell list and the new data cell list.

Figure 13:
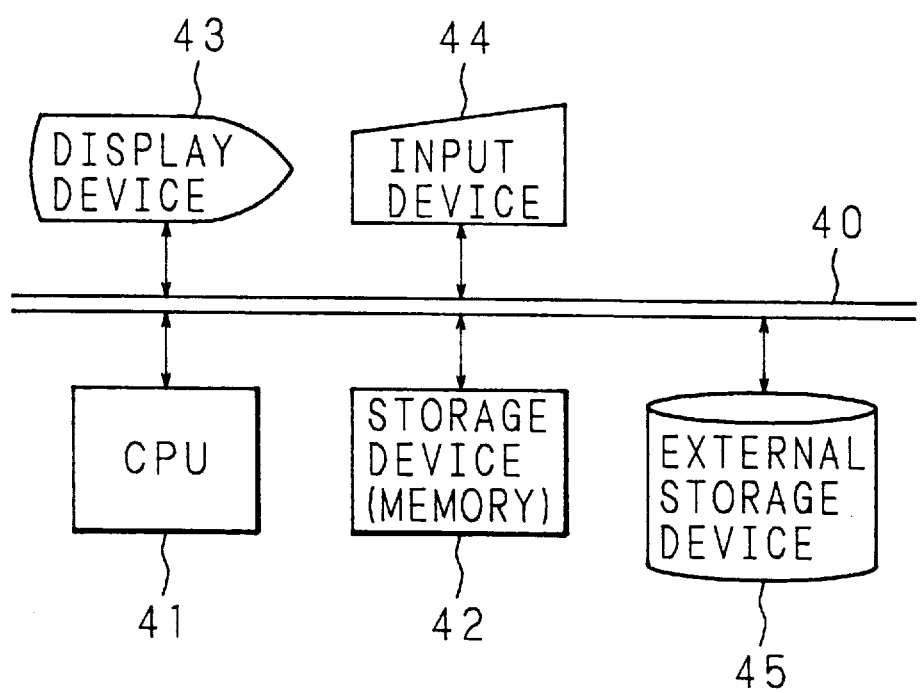
FIG. 13 is a view showing a system in the second preferred embodiment.

Now, a specific example of the second preferred embodiment (Second example) will be described below. The three-dimensional configuration editing apparatus according to the second example has a similar appearance to that of the first example described before (See FIG. 3). FIG. 13 is a view showing a system of the three-dimensional configuration editing apparatus according to the second example. In FIG. 13, denoted at 40 is a data bus. The data bus 40 establishes access between a CPU 41 which corresponds to the computer 30 shown in FIG. 3, a storage device 42 which serves as a memory incorporated in the computer 30, a display device 43 which corresponds to the display 32 shown in FIG. 3, an input device 44 which corresponds to the mouse 33 and an external storage device 45 which serves as a data base.

Figure 14:
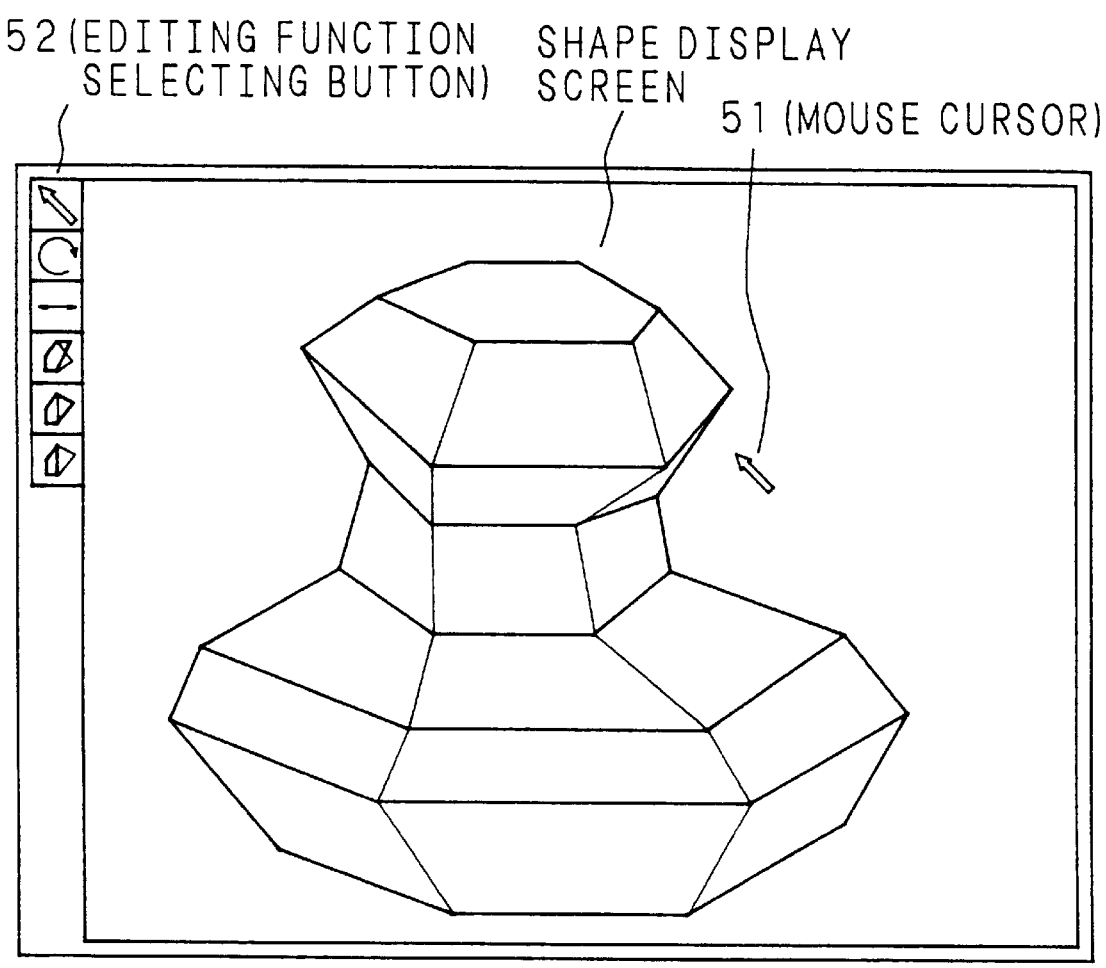
FIG. 14 is a view showing a shape editing screen in the second preferred embodiment.
Figure 16:
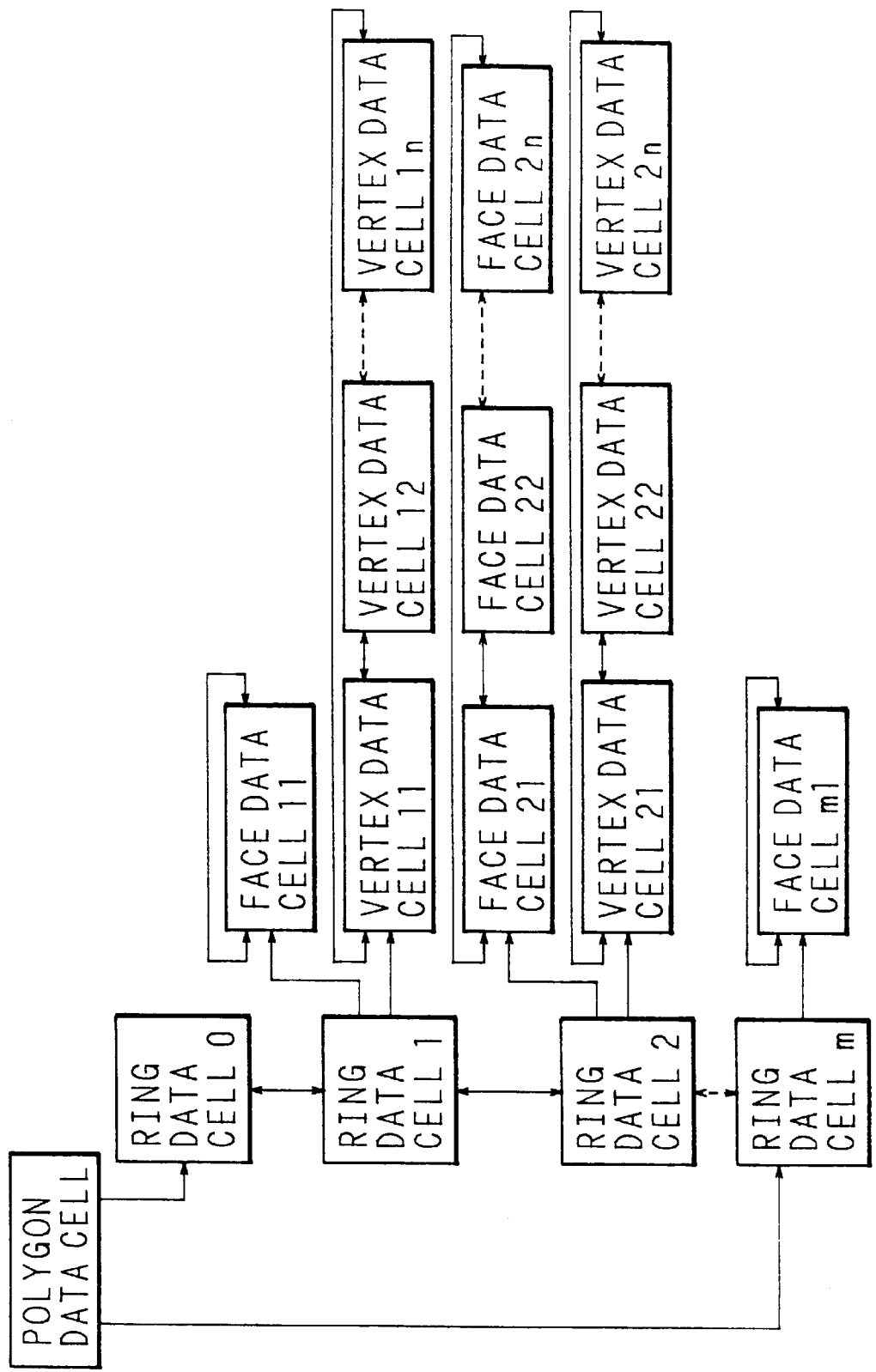
FIG. 16 is an explanatory diagram describing a data structure in the second preferred embodiment.

FIG. 14 is a view showing a shape editing screen in the second example. A mouse cursor 51 is moved and an editing function selecting button 52 is designated by the mouse cursor 51, whereby an editing instruction is inputted while instructing on the screen with the mouse cursor 51. FIGS. 15A and 15B are views showing a specific example of an inner structure of the data cell 200 used in the second example. FIG. 16 is a view showing a data structure which defines the shape of a three-dimensional object in the second example. FIG. 16 omits a link from a face to a vertex and a link of a data cell list for undo processing.

Next, a detailed description will be given on shape editing and undo processing which constitute a feature of the second example.

Figure 12A:
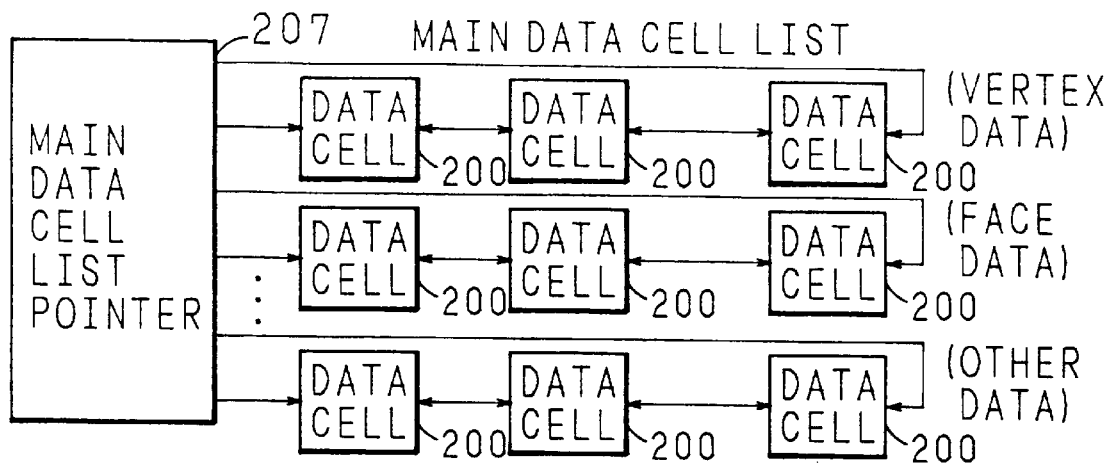
FIGS. 12A to 12C are views showing a data structure (data cell list) in the shape information storing means in the second preferred embodiment.
Figure 12B:
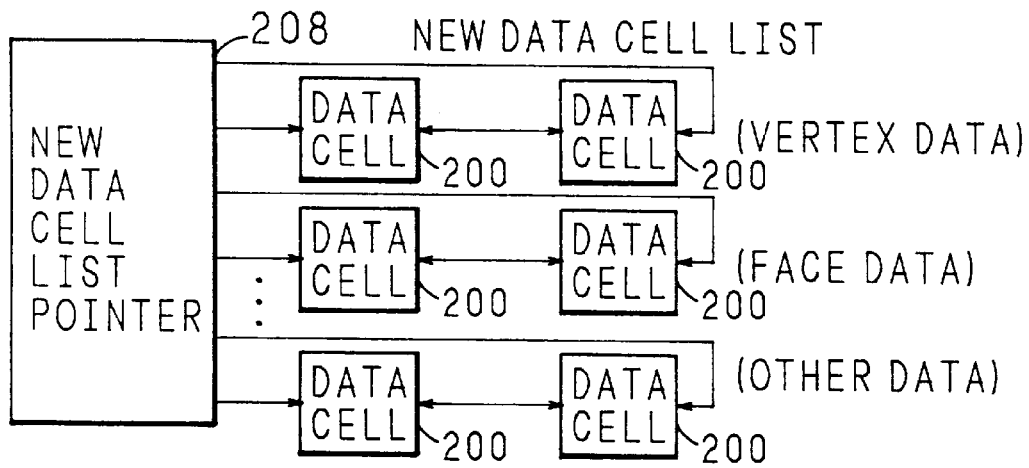

In the second example, a shape at some time point is defined by data which are stored in the present value storing part 201 and the invariant value storing part 203 of each data cell 200 which belongs to the main data cell list (FIG. 12A) and the new data cell list (FIG. 12B). Of these data cells 200, those without a change flag 205 set (i.e., zero) have the present value storing part 201 the invariant value storing part 203 having the same contents with each other. The contents of the old data cell list (FIG. 12C) are not used to define the shape at this point.

Figure 17:
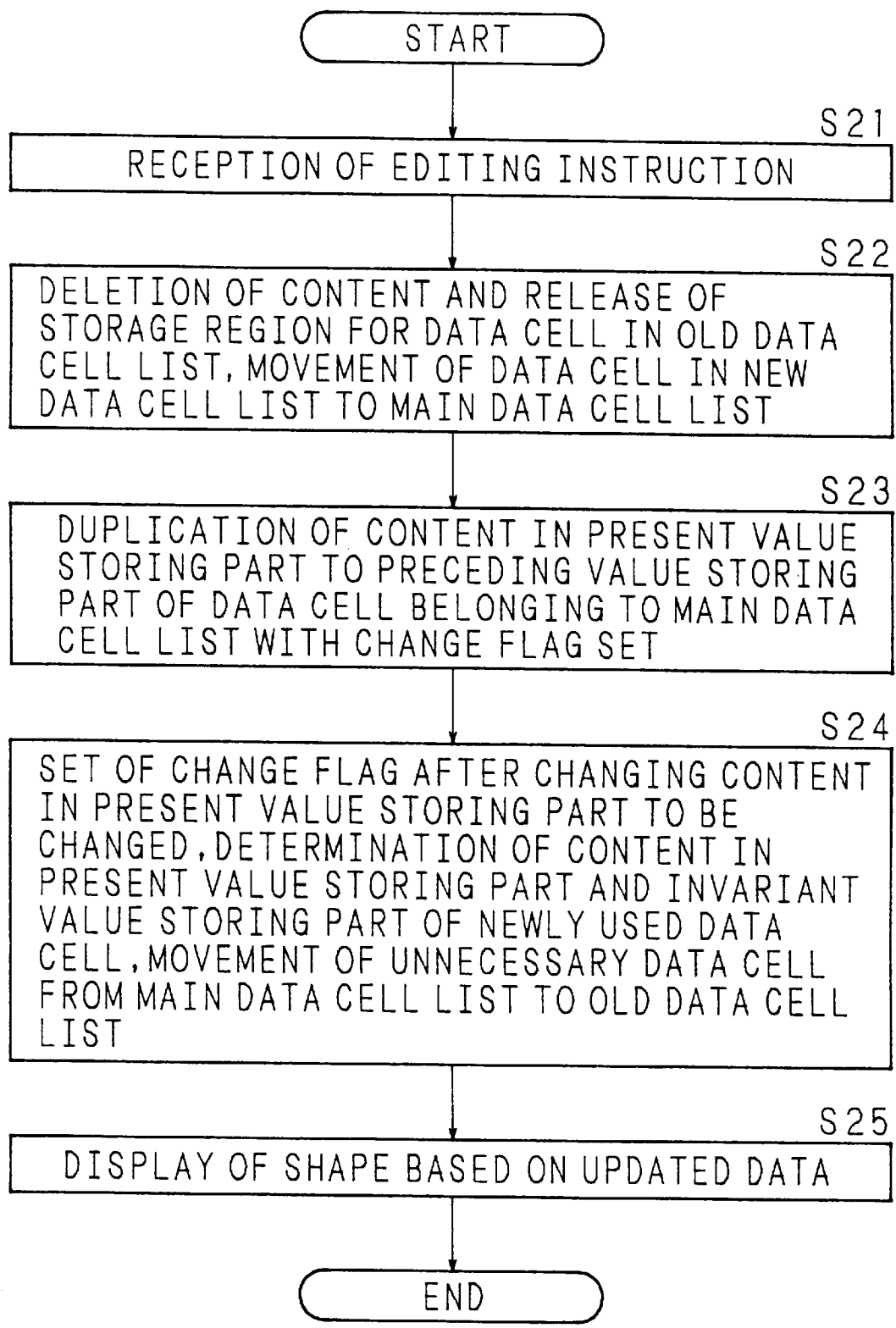
FIG. 17 is a flow chart describing the sequence of editing in the second preferred embodiment.

FIG. 17 is a flow chart describing the sequence of editing in the second example. First, an editing instruction is received (Step S21). The contents of the old data cell list are then deleted to release the memory areas of the data cells 200, and the data cells 200 of the new data cell list are incorporated into the main data cell list (Step S22). As a result, the shape at this point is defined only by data which are stored in the present value storing part 201 and the invariant value storing part 203 of each data cell 200 which belongs to the main data cell list.

Further, for those with the change flags 205 set (i.e., non-zero) among all data cells 200 which are included in the main data cell list, the contents of the present value storing part 201 are duplicated into the preceding value storing part 202, and the change flags 205 are reset (Step S23). As a result, all data cells 200 which are included in the main data cell list have the present value storing part 201 and the preceding value storing part 202 having the same contents with each other, which in turn resets the change flags 205 (i.e., zero). The processing up to this point is preparation for editing.

Editing is performed following this. A memory area is ensured for data cells 200 which are newly used to define the shape, the contents of the present value storing part 201 and the invariant value storing part 203 are determined. As to values to be changed in accordance with an editing instruction, the contents of the present value storing part 201 of the data cell 200 are changed (Step S24). In each data cell 200 whose contents of the present value storing part 201 are changed, the change flag 205 is set. The data cells 200 which are not needed to define the shape any more are transferred to the old data cell list. The newly added data cells 200 are inserted into the new data cell list.

At last, a new shape is displayed based on data which are updated by the editing described above (Step S25).

As a result of such editing, the shape data immediately before the editing are stored in the preceding value storing part 202 and the invariant value storing part 203 of each data cell 200 of the main data cell list and the old data cell list, and the shape data after the editing are stored in the present value storing part 201 and the invariant value storing part 203 of each data cell 200 of the main data cell list and the new data cell list.

Figure 18:
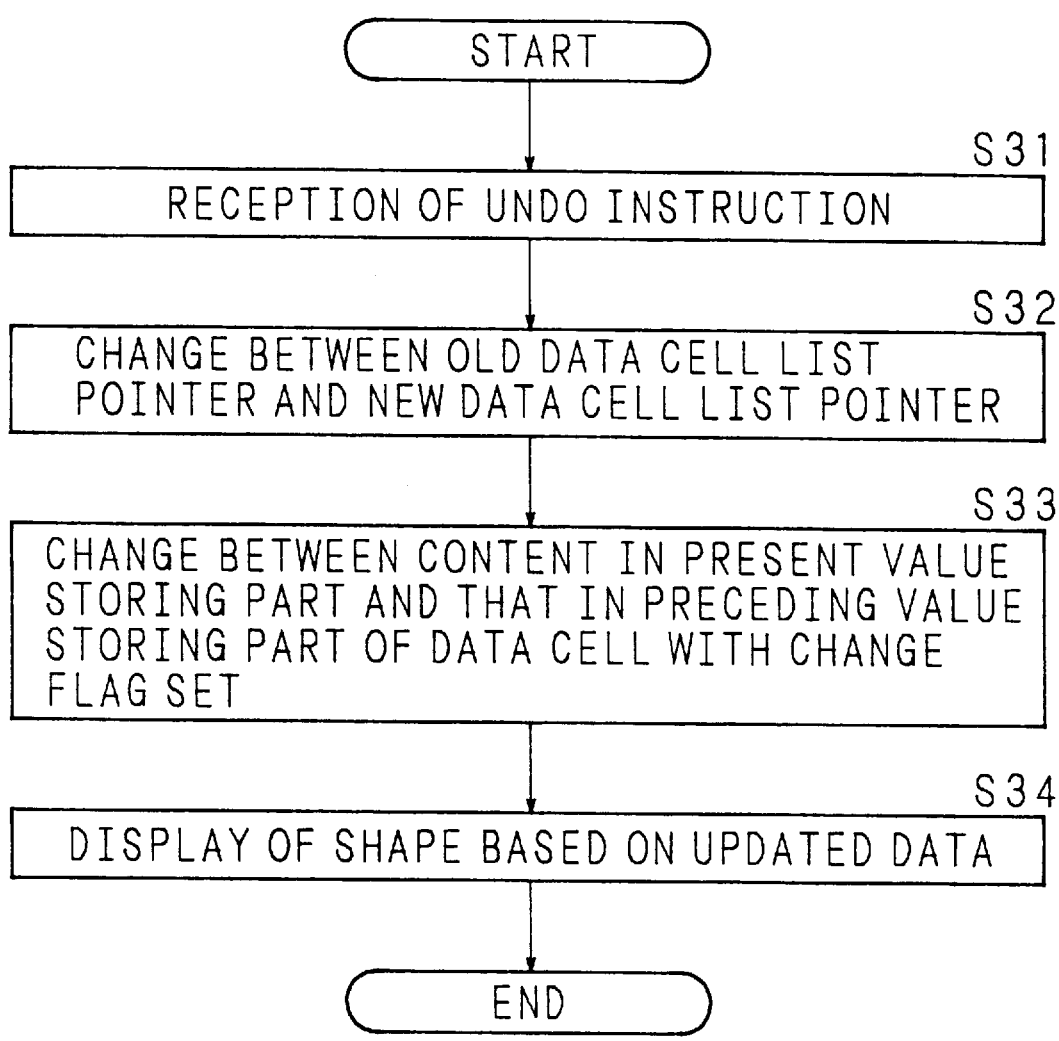
FIG. 18 is a flow chart describing the sequence of undo processing in the second preferred embodiment.

FIG. 18 is a flow chart describing the sequence of undo processing in the second example. First, an undo instruction is received (Step S31). Next, the contents of the main data cell list pointer 208 and the contents of the old data list pointer 209 are switched to each other (Step S32). Following this, in those cells with the change flags 205 set among all data cells 200 of the respective data cell lists, the contents of the present value storing part 201 and the contents of the preceding value storing part 202 are switched to each other (Step S33). A new shape is displayed based on data which are updated by the undo processing described above (Step S34).

As a result of such undo processing, the shape data immediately before the undo processing are stored in the preceding value storing part 202 and the invariant value storing part 203 of each data cell 200 of the main data cell list and the old data cell list, and the shape data after the undo processing, i.e., the shape data immediately before editing or undo processing precedent to the undo processing, are stored in the present value storing part 201 and the invariant value storing part 203 of each data cell 200 of the main data cell list and the new data cell list.

During such editing and undo processing as described above, once the data cells 200 started to be used, addresses of the data cells 200 do not change until the end of the data cells 200. Hence, it is not necessary to assign pointers among the data cells 200 (i.e., pointers indicating information regarding connection shown in FIGS. 15A and 15B) once again during undo processing.

When undo processing is performed twice or more times in succession, a shape which is defined after the last undo processing is of course the same as a shape immediately before the precedent undo processing.

Next, a description will be given on a specific example of configuration editing utilizing the second example and a change in data due to the configuration editing.

FIGS. 19A to 19D are views showing a shape as it changes during configuration editing. In FIGS. 19A to 19D, solid arrows indicate one editing and dotted arrows indicate one undo processing. In a first state shown in FIG. 19A, a quadrilateral which has four vertexes (V0, V1, V2, V3) is defined. In a second state shown in FIG. 19B, a tetrahedron is defined with deleting the vertex V0 from and adding a new vertex V4 to the first state. Since the vertex V0 is deleted, information defining the connection of the vertexes are updated and the vertexes V1 and V3 become vertexes V1a and V3a, respectively.

Figure 19A:
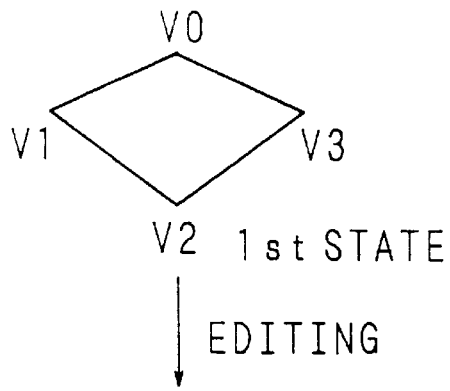
FIGS. 19A to 19D are views showing a specific example of editing of a shape in the second preferred embodiment.
Figure 19B:
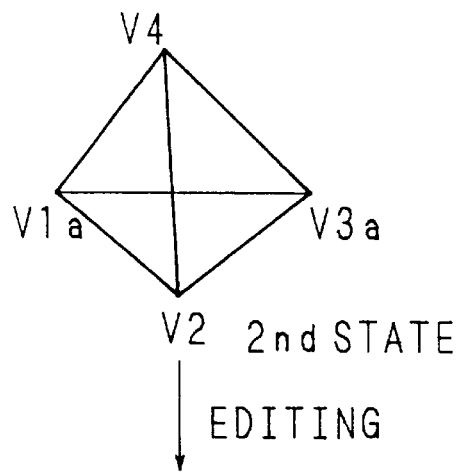
Figure 19C:
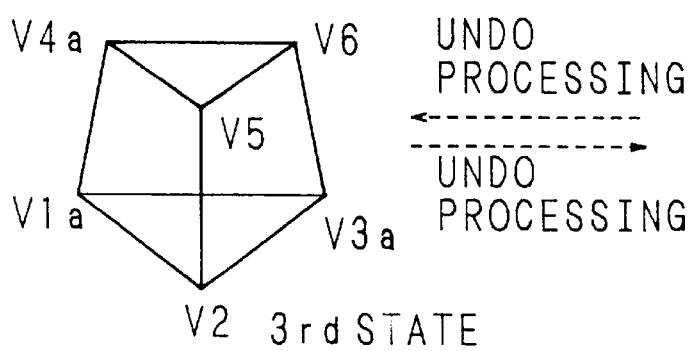
Figure 19D:
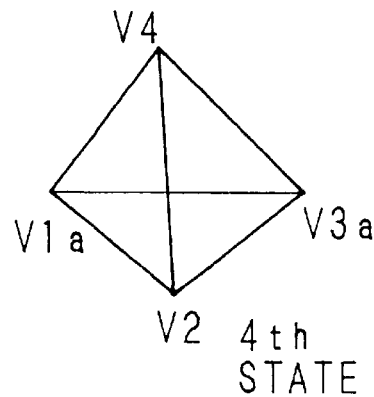

In a third state shown in FIG. 19C, a pentahedron is defined by adding vertexes V5 and V6 to the second state and the vertex V4 is changed to a vertex V4a by changing the position of the vertex V4. In a fourth state shown in FIG. 19D, the shape in the second state is restored as a result of undo processing on the third state. If undo processing is performed again from the fourth state, the shape returns to the condition of the third state.

Figure 12C:
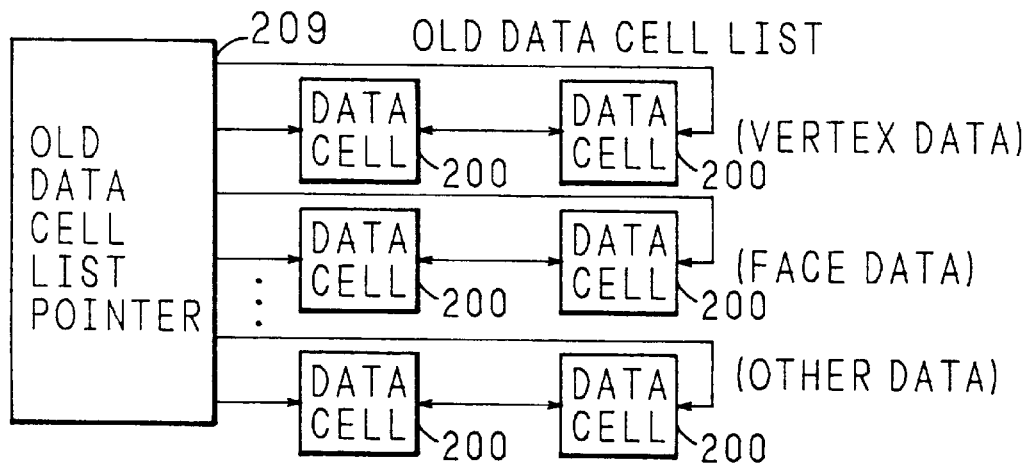

FIGS. 20A to 20D show a change in internal data which correspond to FIGS. 12A to 12C during the configuration editing shown in FIG. 19. FIGS. 20A to 20D show a change regarding only vertexes. The state in FIG. 20A is a state after shifting from the first state (which corresponds to FIG. 19A) to the second state (which corresponds to FIG. 19B) before editing. Editing is then performed, and the state changes to as it is shown in FIG. 20B as a result of Step S22 and Step S23 shown in FIG. 16. Further, as a result of Step S24 shown in FIG. 17, the third state (which corresponds to FIG. 19C) is obtained as shown in FIG. 20C. Next, undo processing is performed at Step S32 and Step S33 shown in FIG. 18 from the third state, whereby the state as shown in FIG. 20D is obtained. The shape which is defined at the state as shown in FIG. 20D is the same as the shape which is defined at the state as shown in FIG. 20A. Undo processing is then performed at Step S32 and Step S33 shown in FIG. 18 from this state, whereby the state as shown in FIG. 20C is obtained again.

As described above, in the second example, undo processing and preparation therefor are performed always in a standardized sequence independently of a data structure for storing a shape and the type of editing on which undo processing is to be performed. This makes it unnecessary to develop undo processing and preparation therefor for each type of configuration editing, improves an efficiency of developing a program and a maintainability, and makes it easy to upgrade the version of the program and to add a new feature. A three-dimensional shape must be expressed by a complex data structure which uses a number of pointers particularly in an interactive three-dimensional configuration editing apparatus. In this regard, the second example is especially advantageous since processing for undo is irrelevant to a data structure. Further, since the invariant value storing part is disposed in addition to the present value storing part and the preceding value storing part and data to be stored in data cells are classified into data which change due to editing and data which do not change due to editing, unnecessary duplication and redundancy of data are avoided and therefore a processing efficiency and a memory efficiency are improved.

In addition, in the interactive three-dimensional configuration editing apparatus according to the second example, it is possible to perform undo processing and preparation therefor on any type of editing always in the same sequence. Thus, the apparatus has an undo function which deals with various types of editing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A three-dimensional configuration editing apparatus for interactive editing of a shape of a three-dimensional object displayed on a screen, comprising:

polygon vertex position storing means for storing positions of vertices of polygons arranged in three-dimensional space, each polygon having n sides and corresponding vertices in at least one adjacent polygon;

polygon arrangement displaying means for displaying a perspective view of the polygons with the corresponding vertices connected by straight lines to form a three-dimensional object by linearly enveloping the polygons;

editing instruction processing means for receiving an editing instruction regarding at least one selected polygon forming the three-dimensional object and for instructing said polygon arrangement displaying means to display a circumscribing rectangle for each selected polygon to enable interactive editing of the circumscribing rectangle; and polygon vertex position updating means for updating stored information regarding the positions of each vertex affected by the interactive editing of the at least one selected polygon designated by the editing instruction.

2. A three-dimensional configuration editing apparatus of claim 1, wherein said polygon vertex position updating means comprises:

polygon vertex position changing means for changing the stored information regarding the position of each vertex designated by the editing instruction or the position of a vertex in the at least one selected polygon designated by the editing instruction; and polygon vertex position deleting means for deleting the stored information regarding the position of a designated vertex designated by the editing instruction and the position of the corresponding vertex of the at least one adjacent polygon and all vertices directly or indirectly corresponding thereto.

3. A three-dimensional configuration editing apparatus of claim 2, wherein said polygon vertex position updating means further comprises polygon vertex position adding means for creating a new vertex at a position designated by the editing instruction and a corresponding position in another polygonal surface or a position within the arrangement of a polygonal surface which is designated by the editing instruction all other of the polygons, and for adding the position and the corresponding position of each new vertex to the stored information.

4. A three-dimensional configuration editing apparatus for interactive editing of a three-dimensional object displayed on a screen, comprising:

instruction receiving means for receiving an instruction;

shape information storing means for storing shape information in a plurality of data cells defining a present shape and restoration information needed to restore the present shape as it was immediately before most recent editing, said shape information storing means having a pointer for a list of one or more of the data cells which are newly created by the most recent editing, a pointer for a list of one or more of the data cells which have existed even before the most recent editing, and a pointer for a list of one or more of the data cells which are not necessary any more to define the present shape of the three-dimensional object because of the most recent editing, and each one of the data cells including a present value storing part for storing information regarding the present shape, a preceding value storing part for duplicating information currently stored in the present value storing part immediately before the most recent editing or undo processing and storing the restoration information therein, and a pointer for forming a list indicating linkage between the data cells;

shape displaying means for displaying the present shape;

editing means for editing the present shape stored in said shape information storing means in accordance with the instruction received by said instruction receiving means;

undo preparing means for storing, during editing and undo processing, most recent editing in accordance with information stored in said shape information storing means.

5. A three-dimensional configuration editing apparatus as recited in claim 4, wherein each one of the data cells includes a change flag indicating whether information stored in said present value storing part of said one of the data cells coincides with information stored in said preceding value storing part of said one of the data cells.

6. A three-dimensional configuration editing apparatus as recited in claim 4, wherein each one of the data cells includes an invariant value storing part for storing information which does not change once said one of the data cells is created until said one of the data cells is eliminated.

7. A three-dimensional configuration editing apparatus as recited in claim 4, wherein each one of the data cells includes a temporary value storing part for storing information which is temporarily used for editing or displaying of a shape.

8. A method of editing three-dimensional objects displayed on a computer screen in an interactive manner, comprising:

storing positions of vertices of polygons arranged in three-dimensional space, each polygon having n sides and corresponding vertices connected by straight lines in at least one adjacent polygon;

displaying a perspective view of the polygons to form a three-dimensional object;

processing an editing instruction regarding at least one selected polygon forming the three-dimensional object to display a circumscribing rectangle of the at least one selected polygon and to enable interactive editing of the circumscribing rectangle; and updating said displaying of the polygons affected by the interactive editing of the at least one selected polygon.

9. A method as recited in claim 8, further comprising displaying a circumscribing rectangle for each selected polygon, and wherein said interactively editing includes interactively editing the circumscribing rectangle.

* * * * *

UNITED STATES PATENT AND TRADEMARK OFFICE
CERTIFICATE OF CORRECTION

PATENT NO.:     5,850,223
DATED      :    December 15, 1998
INVENTOR(S):    Takushi FUJITA et al.

It is certified that error appears in the above-identified patent and that said Letters Patent is hereby corrected as shown below:

In the Title Page- Item 75- change "Kanagawa" to --Kawasaki--

-column 4, line 16, insert --,-- after "surfaces"

-column 6, line 43, change "rings" to --ring--, first occurrence.

Signed and Sealed this

Thirty-first Day of August, 1999

Attest:

Q. TODD DICKINSON

*Attesting Officer*       *Acting Commissioner of Patents and Trademarks*